(12) United States Patent
Terrell

(10) Patent No.: US 10,299,440 B2
(45) Date of Patent: May 28, 2019

(54) APPARATUS FOR TREE TRIMMING AND TREE MAINTENANCE

(71) Applicant: Steven J Terrell, Hemphill, TX (US)

(72) Inventor: Steven J Terrell, Hemphill, TX (US)

( * ) Notice: Subject to any disclaimer, the term of this patent is extended or adjusted under 35 U.S.C. 154(b) by 137 days.

(21) Appl. No.: 15/070,293

(22) Filed: Mar. 15, 2016

(65) Prior Publication Data

US 2016/0192595 A1 Jul. 7, 2016

Related U.S. Application Data

(63) Continuation of application No. 13/441,377, filed on Apr. 6, 2012, now Pat. No. 9,307,704.

(60) Provisional application No. 61/482,807, filed on May 5, 2011.

(51) Int. Cl.
*A01G 23/095* (2006.01)
*A01G 3/08* (2006.01)
*A01G 23/087* (2006.01)
*A01G 23/091* (2006.01)

(52) U.S. Cl.
CPC .......... *A01G 3/088* (2013.01); *A01G 23/087* (2013.01); *A01G 23/091* (2013.01); *A01G 23/095* (2013.01)

(58) Field of Classification Search
CPC .... A01G 23/08; A01G 23/083; A01G 23/087; A01G 23/091; A01G 23/093; A01G 23/095
See application file for complete search history.

(56) References Cited

U.S. PATENT DOCUMENTS 6,408,906 B1 * 6/2002 Moon ...................... A01G 3/08
144/24.13
7,284,718 B2 * 10/2007 Christenson .......... E02F 3/3609
241/101.73

* cited by examiner

*Primary Examiner* — Matthew Katcoff
(74) *Attorney, Agent, or Firm* — Nolte Intellectual Property Law Group

(57) ABSTRACT

Disclosed herein is an apparatus preferably coupled to a boom on a truck, the apparatus capable of a plurality of configurations for a variety of applications. In one configuration, the apparatus can perform rapid semi-precise cutting of vegetation. In another configuration, the apparatus can perform more precise trimming of one or more areas (e.g., limbs) and optionally use a limb clamp to prevent cut limbs/vegetation from arbitrarily falling on objects below the cutting area. In yet another configuration, the apparatus can have a grapple or similar device attached to the end of the boom for use in relocating debris or for loading debris into a removal facility such as dump or garbage truck. In each configuration, the apparatus comprises one or more rotatable or pivoting couplings to allow for rotation about one or more axis and therefore allow precise manipulation from an operator in the vehicle or on the ground.

18 Claims, 21 Drawing Sheets

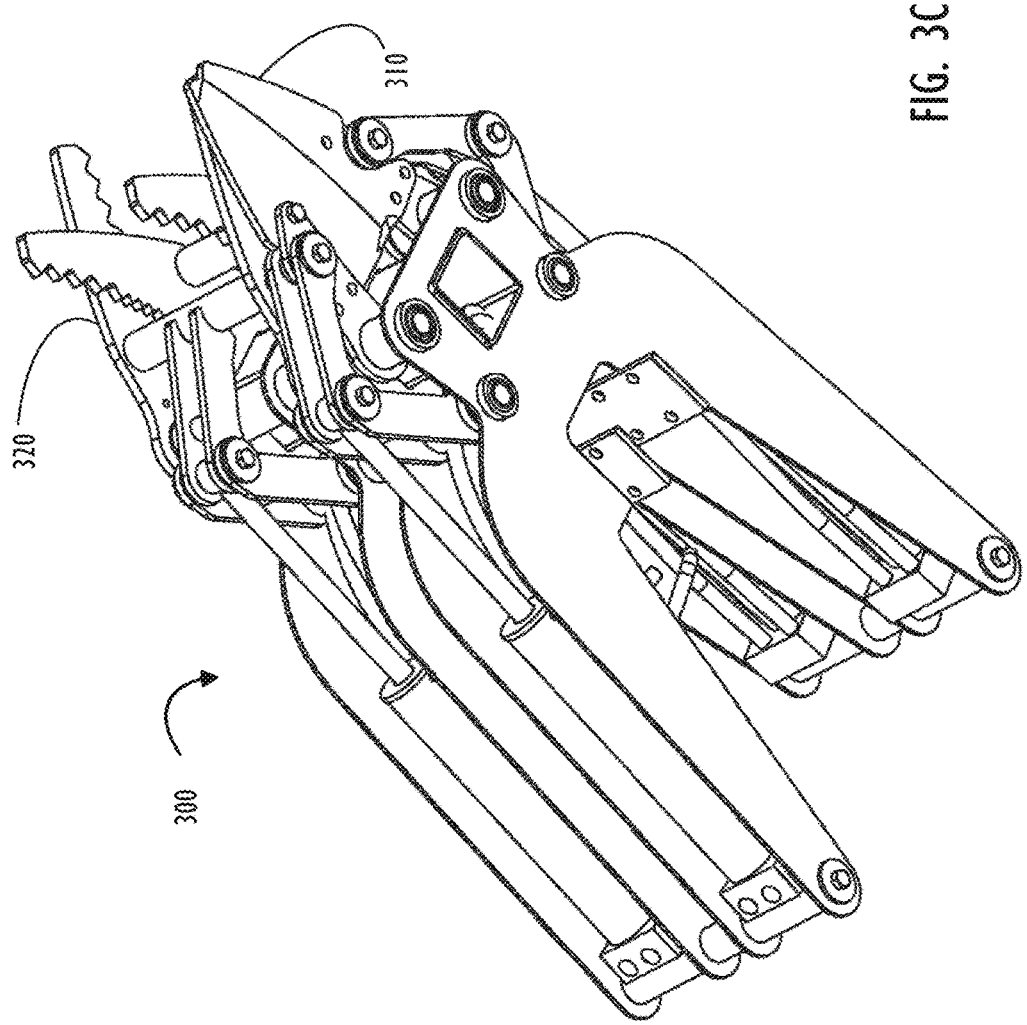

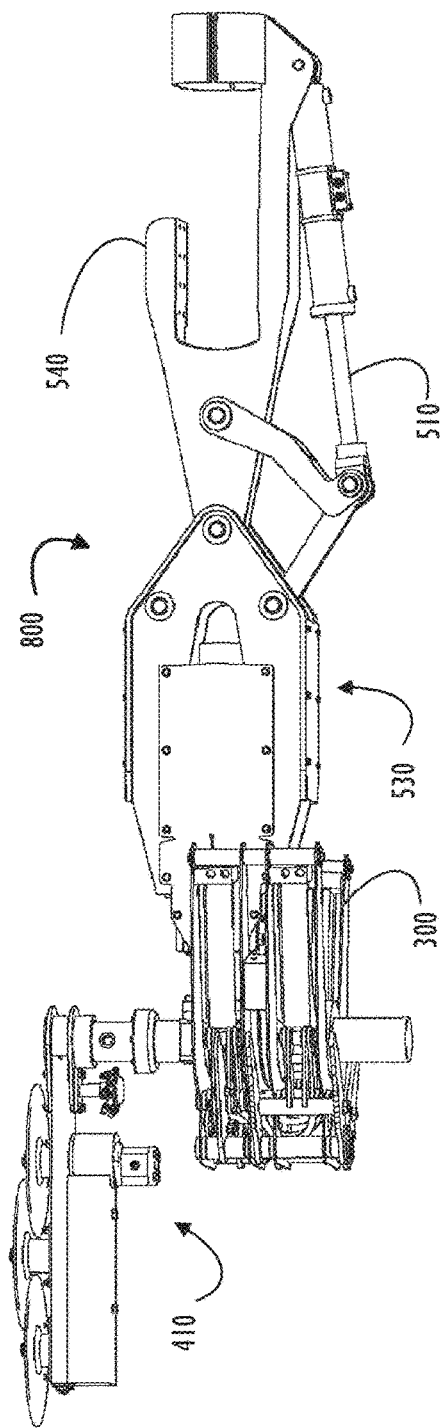
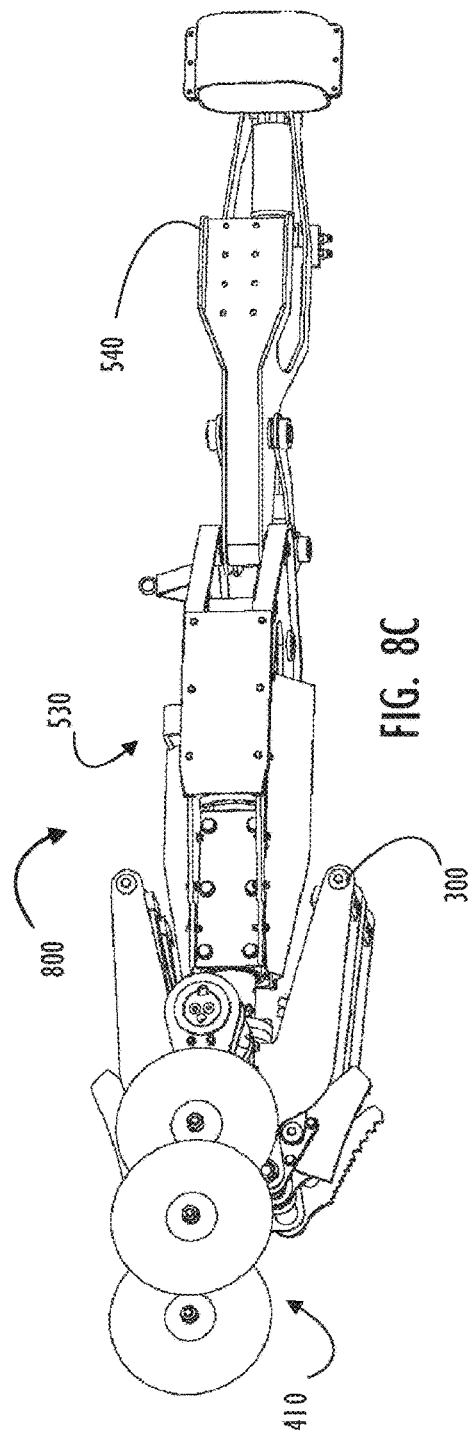

APPARATUS FOR TREE TRIMMING AND TREE MAINTENANCE

CROSS REFERENCE TO RELATED APPLICATIONS

This disclosure is a continuation of, and claims priority to, U.S. patent application Ser. No. 13/441,377 entitled "Apparatus for General Tree Trimming or Precision Tree Trimming" filed 6 Apr. 2012 by Steven J. Terrell which is hereby incorporated by reference in its entirety for all available purposes. This disclosure is also related to U.S. patent application Ser. No. 13/441,453 entitled "Apparatus for General Tree Trimming or Precision Tree Trimming Having an Aerial Tank" by Steven J. Terrell filed on 6 Apr. 2012 which is also incorporated by reference in its entirety. This disclosure also relates to U.S. Provisional Application No. 61/482,807 filed 5 May 2011 to which priority is claimed and which is also incorporated by reference in its entirety.

FIELD OF INVENTION

This disclosure pertains to an apparatus for trimming trees and other vegetation and more particularly to an apparatus configurable, possibly in the field, for either ground based semi-precise aerial trimming of trees and vegetation or for precision ground based aerial trimming.

BACKGROUND

Electrical power lines often run through heavily wooded areas, either in neighborhoods or in rural areas. Normally a path, or right of way, is cut through such wooded areas to make way for the power lines, but eventually the trees or other vegetation will encroach upon this path and it will need to be trimmed back. For example, tree limbs over time may grow over the power lines, presenting the risk of damaging the lines should the limbs fall or make contact with the lines during a storm. Typically, such trimming is required every five years or so, although this time period can be shorter or longer in a given area. Because power lines often span long distances, such as hundreds of miles, a trimming operation can be a complex and time intensive endeavor for which efficiency is a priority. Two different types of approaches have been used in the prior art. Typically, to trim around transmission lines (which go cross country) a rough cutting and partially automated mechanism has been used. Alternatively, in residential/commercial areas serviced by electrical distribution lines a manual approach has been utilized.

In one common manual approach, a mobile unit such as an "insulated bucket truck" is utilized. The bucket truck has an insulated bucket or basket connected to an insulated boom (crane like structure), which is in turn connected to the chassis of the truck. The bucket (or "basket" as it is sometimes known) contains room for a worker and associated tree trimming equipment, such as a hand operated chainsaw or hydraulic pole saw. Once in the bucket, the worker can be lifted up to an appropriate height and location to trim the trees. Thus, the worker can manually cut tree limbs to combat encroachment of the trees toward the power lines. This approach, however, is not optimal for several reasons. The manual approach is slow, involves potential risk of injury to the worker and associated potential liability, and might allow the cut refuse to fall freely and dangerously to the ground. Alternatively, the cut refuse can be manually lowered with a rope to the ground below, but this is slow and cumbersome.

Improvements over the bucket technique have been introduced in the prior art, such as that described in U.S. Pat. No. 5,501,257 (the '257 patent), which is incorporated by reference in its entirety. The '257 patent describes a boom with a mountable assembly on the end instead of a bucket. The assembly contains jaws for clamping a tree limb to be cut and a saw arm for cutting the grasped limb. The assembly can spin the saw arm around the axis formed by the boom to allow the jaws to be brought into alignment with a tree limb and then rotate the saw arm in a circular fashion to cut the clamped limb. After cutting, the saw blade can be retracted and, in theory, the cut tree limb will be held in place by the jaws, which will then allow the operator to place the cut limb on the ground for disposal.

Another prior art practice relating to tree clearance around electrical lines involves the trimming of tree limbs and administration of herbicides or wound dressing to impede future tree growth. Herbicides administered using the bucket technique described above suffer from concerns about the health and safety of the aerial worker falling or coming into contact with dangerous herbicides or inadvertent electric shock when a liquid comes in contact with a power line. An automated distribution of herbicides from an apparatus at the end of a boom represents an improvement over the bucket technique and is described in U.S. Pat. No. 6,990,770 which is hereby incorporated by reference herein.

As explained above, certain prior art techniques have been used to provide an efficient yet somewhat non-precise solution to cutting of tree limbs and other foliage around rights of way. In particular, prior art approaches are limited with respect to a comprehensive axial rotation of a cutter head assembly. Additionally, prior art solutions are usually limited in the amount of reconfiguration available in the field for the entire cutting apparatus attached to the end of the boom. Therefore, it would be desirable to provide a more precise and possibly field configurable apparatus for trimming foliage around power lines and other areas where automated yet precise trimming may be desired. This disclosure presents several embodiments of such a solution.

BRIEF DESCRIPTION OF THE DRAWINGS

FIGS. 3A-D illustrate, in different perspective views, a possible configuration of a cutter head assembly which may be connected, usually through a boom actuator and attachment assembly, to a boom of a ground based vehicle according to one or more disclosed embodiments.

FIGS. 8A-C illustrate, in different perspective views, a boom actuator and attachment assembly and a connected cutter head assembly in one possible configuration.

DETAILED DESCRIPTION

Disclosed herein is an apparatus preferably coupled to a boom on a truck which can simultaneously trim and chemically treat trees or other vegetation with an herbicide. The apparatus is capable of being configured into a plurality of configurations in the field via "quick connect" type couplings. The quick connect type couplings can be used, in some embodiments, for attaching tools and for attaching hydraulic hoses to ports of specially designed load bearing swivels. In some configurations, the apparatus is capable of performing rapid semi-precise cutting of vegetation. In an alternate use mode or configuration, the apparatus is capable of performing precision trimming of one or more limbs and optionally using a clamping mechanism to prevent cut limbs/vegetation from inadvertently falling on objects directly beneath the cutting area. The end of the boom may also be configured into a grapple type tool (e.g., a grapple head assembly) for use in relocating debris into a removal apparatus such as a dump truck or garbage truck. The grapple head assembly can utilize quick connect style hydraulic connection couplings for connecting to the boom actuator and attachment mechanism. In contrast to prior art debris removal grapple equipment, the grapple head assembly can be extendable upwards utilizing the aerial boom.

While the present disclosure is described in the context of trimming trees around electrical lines, there are other areas which may also benefit from embodiments of a precise and automated tree trimming apparatus as disclosed. For example, sometimes heavy foliage develops as a canopy over road-ways and in residential areas possibly overhanging structures. An apparatus from some embodiments disclosed herein may be useful in vegetation maintenance required in those areas. Additionally, several types of industries may require vegetation maintenance in varying degrees of precision, such as, tree growers, pipeline companies to maintain rights of way, ski lifts, parks and recreation, etc. Therefore, the disclosed embodiments are not intended to be limited to maintenance of foliage around electrical lines but will have other uses as will be apparent to those of ordinary skill in the art given the benefits of this disclosure. Also, throughout this disclosure like elements from earlier embodiments are labeled with the same element numbers and are not further discussed in every embodiment.

Figure 1:
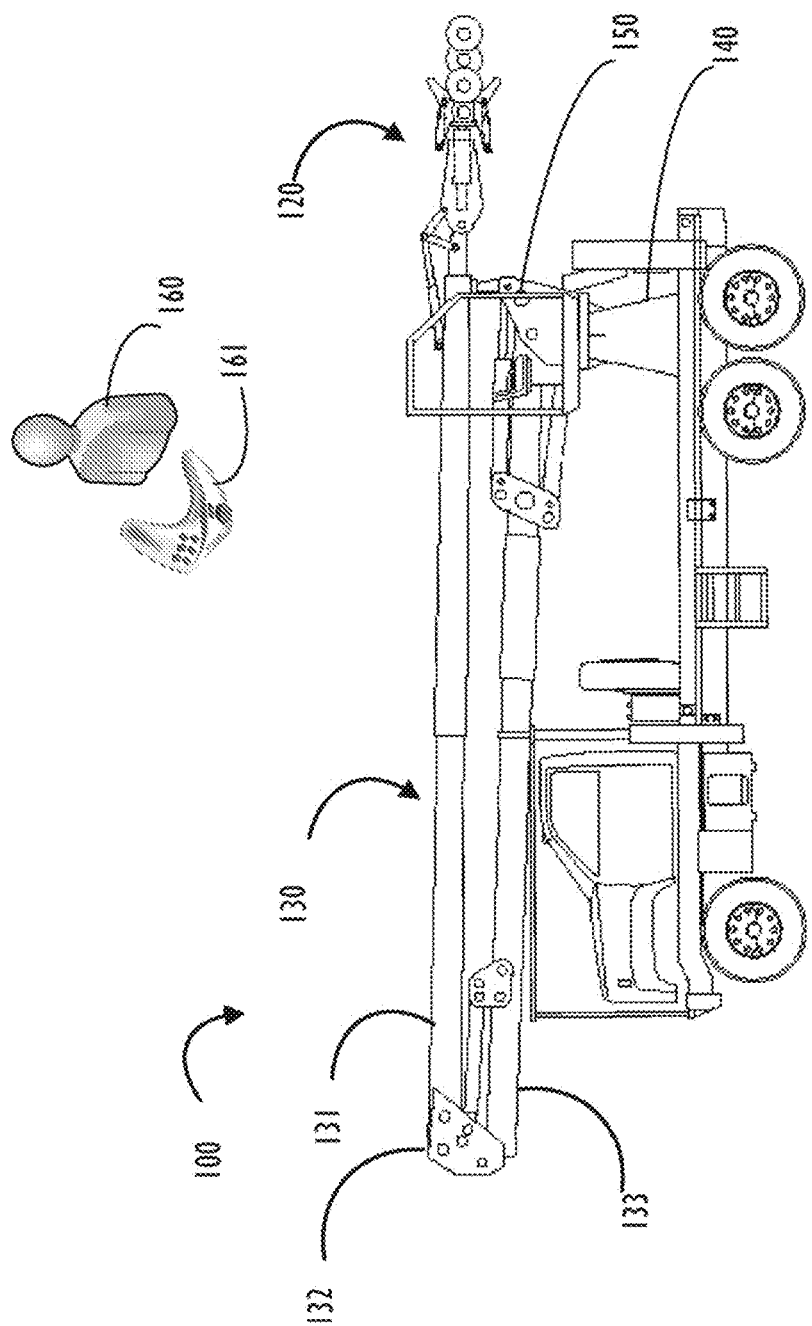
FIG. 1 illustrates a truck with a boom, to which can be connected an apparatus for trimming of trees and other vegetation according to one or more disclosed embodiments.

Referring now to FIG. 1, truck 100 is shown according to one disclosed embodiment. Truck 100 comprises a boom 130 and a tree trimming apparatus 120 connected to a far end (i.e., distal end) of boom 130 with near end (i.e., proximate end) of boom 130 connected to truck 100. Tree trimming apparatus 120 comprises multiple section and connection points to allow it to be configured into a variety of different operational modes depending on a cutting task. Truck 100 illustrates a conventional vehicle suitable for managing the terrain in the area of interest for maintenance of vegetation. Although shown as a truck 100, any vehicle, carrier, or trailer suitable to reach the area of interest could be used (e.g., work-boat, railcar, truck carrier, off-road, rubber tire carrier, crawler, truck equipped with hi-rails (e.g., for track), etc.). The transport vehicle, such as truck 100, should also take into account operating characteristics of the boom and cutter head assembly (e.g., rollover prevention, stress loading, etc.). Specific capabilities for each of boom 130, tree trimming apparatus 120 will be described in more detail below.

Boom 130 can be constructed from fiberglass, steel, a combination thereof or other suitable material. Construction of boom 130 should take into account work areas in proximity to electrical power lines and therefore it is preferable for the boom to be insulated completely or have at least one section (typically more than one) that acts as an insulator to electrical current. Additionally, boom 130 can be made up of one or more sections (e.g., upper boom 131 and lower boom 133) for extension and/or articulation. For example, boom 130 could be a telescoping boom, a multi-section over-center knuckle boom, or a non-over-center knuckle boom. Each embodiment of boom 130 as a knuckle boom could comprise one or more knuckle joints 132. In some embodiments a combination of telescoping sections and knuckle joints 132 may be utilized. When designing embodiments of boom 130, weight capacity of boom 130 should also be taken into account (e.g., for support of a cutter head assembly and attachments) as well as accounting for duty cycles of boom 130 itself. Non-conductive hydraulic hoses and herbicide supply hoses can be internal to boom 130 structure to avoid entanglement when boom 130 is maneuvered around and through vegetation and other objects in the work area. In one embodiment, up to thirteen (13) hoses each capable of 3000 pounds per square inch (PSI) pressure could be utilized. When hoses are internal to a telescoping embodiment of boom 130, hoses must be able to travel while boom 130 is being extended or retracted and a pass through swivel can allow for ported hydraulic fluid conductivity through areas of axial rotation.

In a multi-section boom, configured as either a telescoping embodiment or a knuckle joint embodiment, it may be desirable for each section to be capable of manipulation independent of other sections. As shown in FIG. 1, boom 130 is attached to a transport vehicle, such as truck 100, at a fixed pedestal 140 and rotatable around an axis perpendicular to the chassis of the transport vehicle. Operator platform 150 typically rotates with boom 130 to allow for easier operator control. Also, as explained in more detail later, Boom 130 may also have a liquid supply tank mounted above all or a majority of the articulation points of the boom to minimize or eliminate need for supply hoses to travel internal to the boom's structure. FIG. 1 also shows an operator 160 and remote control 161, described in more detail below. Remote control 161 allows an operator 160 to control boom 130 and tree trimming apparatus 120 from a location other than in operator platform 150.

Figure 2:
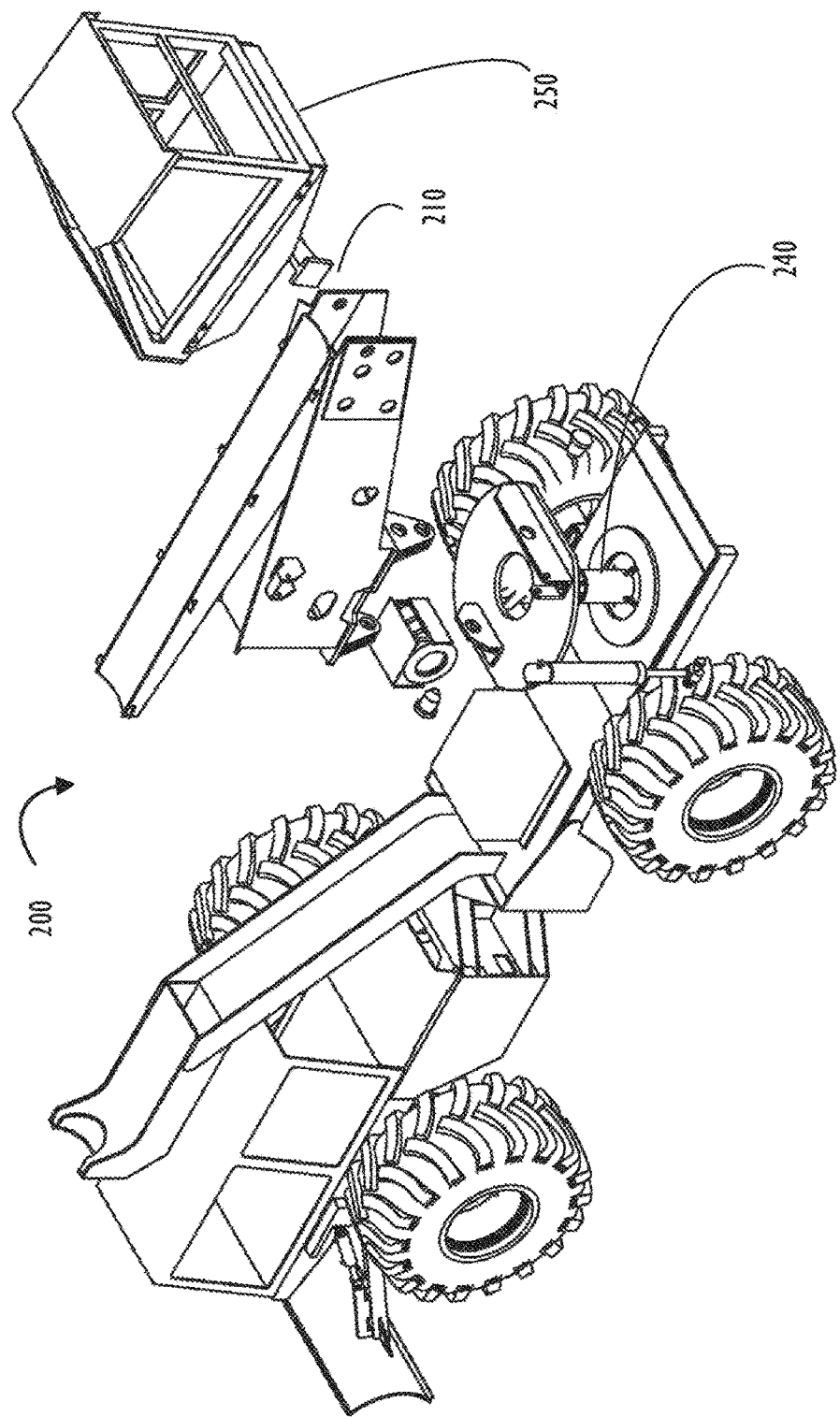
FIG. 2 illustrates an alternative transport vehicle for a boom and cutter head assembly according to one or more disclosed embodiments.
Figure 3A:
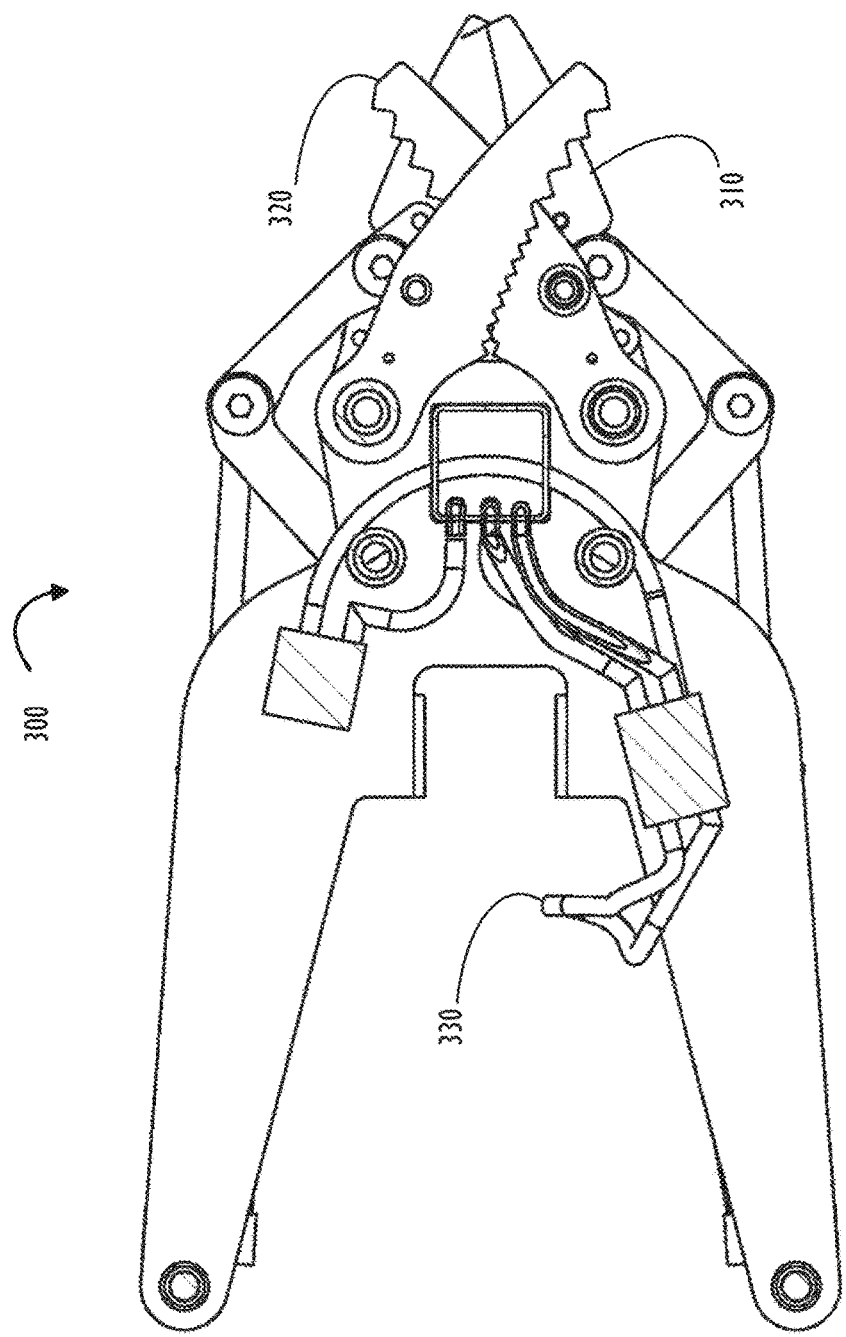
Figure 3B:
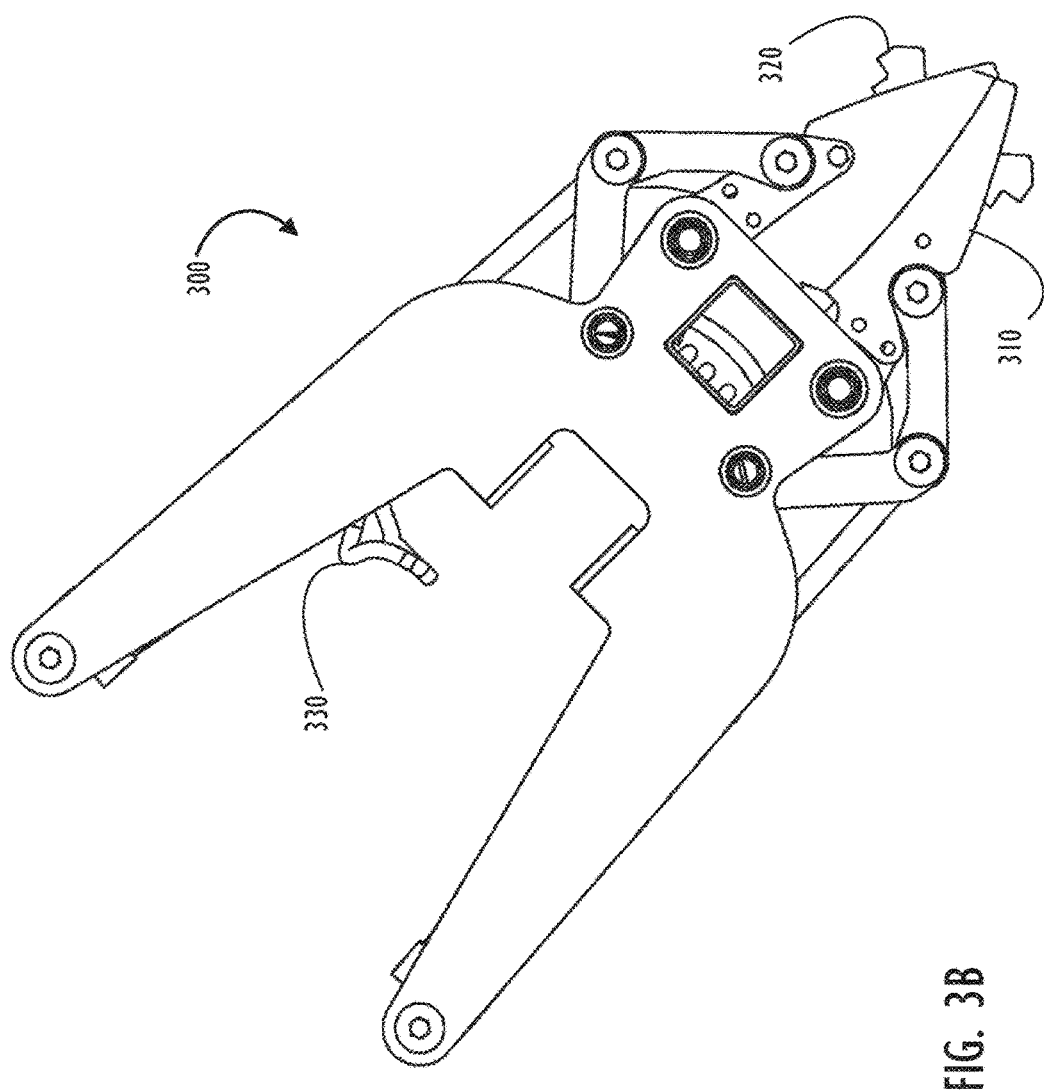
Figure 3D:
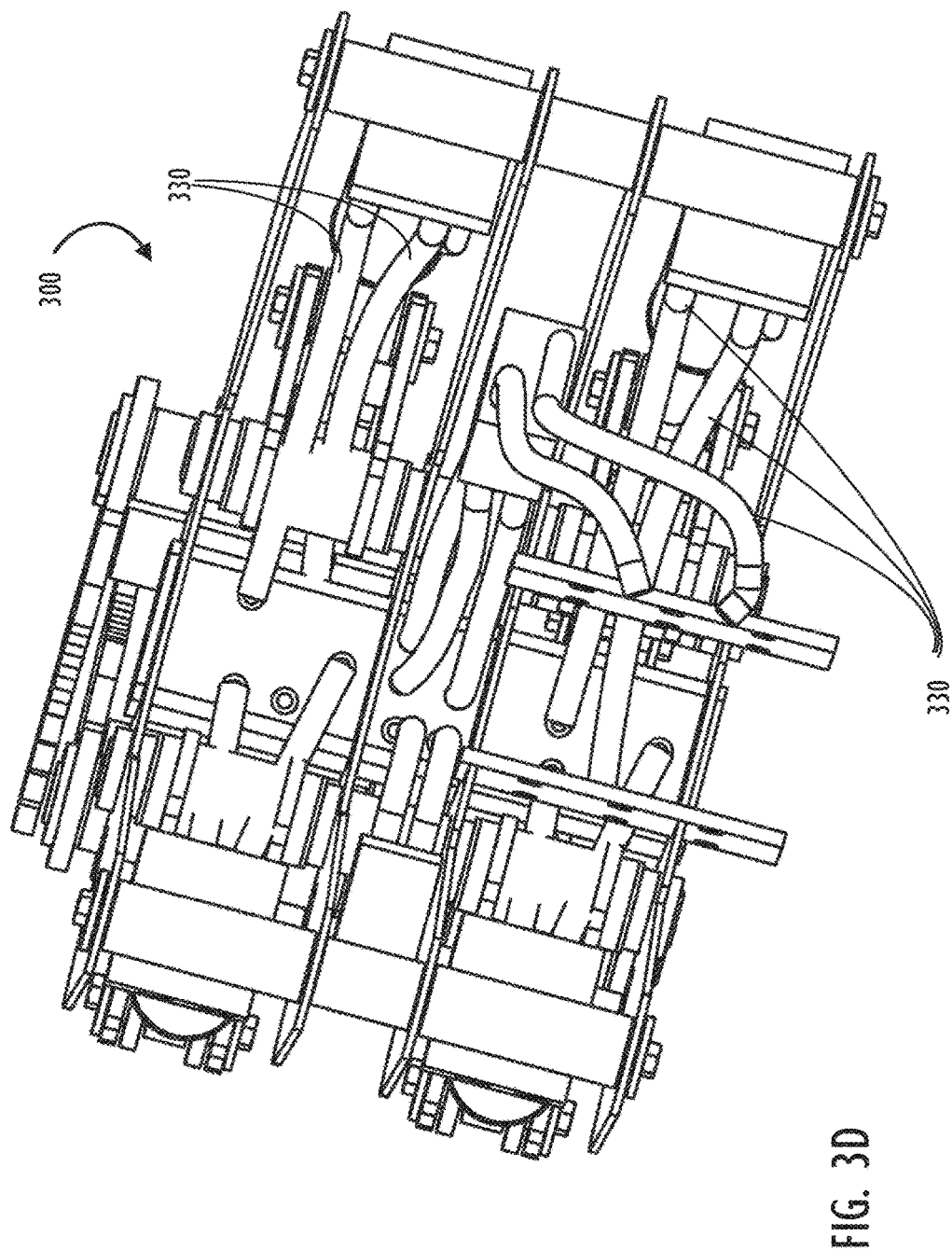

Referring now to FIG. 2, transport vehicle 200 illustrates one possible alternative carrier for a boom similar to boom 130. Transport vehicle 200 comprises a rotational pivot 240 to allow the entire boom assembly to rotate about an axis perpendicular to its central axis. Operator cab 250 can be attached to the base of boom 130 or to the upper portion of rotational pivot 240 with a self-leveling connection (not shown) at point 210. The self-leveling connection allows an operator inside operator cab 250 to maintain a level perspective with the horizon even if transport vehicle 200 is on uneven terrain. Thereby aiding the operator in performing precision tree trimming according to the several disclosed embodiments. Operator cab 250 can also act as a counter balance weight for transport vehicle 200 and an extended boom 130 in certain situations.

Referring now to FIGS. 3A-D cutter head assembly 300 is typically configured at the far end of tree trimming apparatus 120 (from FIG. 1). Cutter head assembly 300 performs the actual cutting and clamping of the target vegetation. Also, tree trimming apparatus 120 is attached to boom 130 via a boom clamp 540 (described with FIG. 5). Cutter head assembly 300 is shown in different perspective views in FIGS. 3A-D for a single example embodiment. Recall that cutter head assembly 300 is field configurable, with a variety of tree maintenance accessories, for a particular tree cutting environment or task. For example, cutter head assembly 300 can be configured in the field with a plurality of attachments based on an operator's particular needs to complete a given work effort. In this example embodiment, cutter head assembly 300 is configured to have as accessories a limb shear 310, and limb clamps 320, and any of several sawing devices (not shown), such as a chainsaw blade, a single rotary saw blade, or a mechanism with multiple rotary saw blades. As used herein, a "shear" refers to any of various implements or machines that cut with a scissorlike action in contrast to cutting by wearing away a material as in sawing. An example of a saw arm attachment 410 containing three rotary saw blades or a chainsaw style blade can be seen in the Figures, and will be described subsequently, but is not shown in FIGS. 3A-D so that further details of limb shear 310 and limb clamps 320 attachments can be appreciated.

In one embodiment, limb clamp 320 is configured as a proportional pressure clamp because different types of wood have different densities and breaking thresholds. Additionally, limb clamp 320 can be configured with serrated teeth that vary in size and shape to improve gripping capability and because clamping pressures vary from the throat of the jaws to the tips of the jaws. When configured with a limb clamp 320 and a limb shear 310, cutter head assembly 300 can be used for very precise single limb cutting. Precise control may be required to prevent cutting a plurality of limbs and to prevent the cut portion from falling on objects beneath the point of cut. In use, an operator 160 can also simply rotate the cut portion to be vertical so that it can be released and more easily fall through lower vegetation. Cutter head assembly 300 also has a plurality of hydraulic hoses 330 independently connected to different attachments to allow operator 160 to operate each attachment as required for the task at hand (for clarity not all hoses of FIGS. 3A-D have element numbers).

Figure 4:
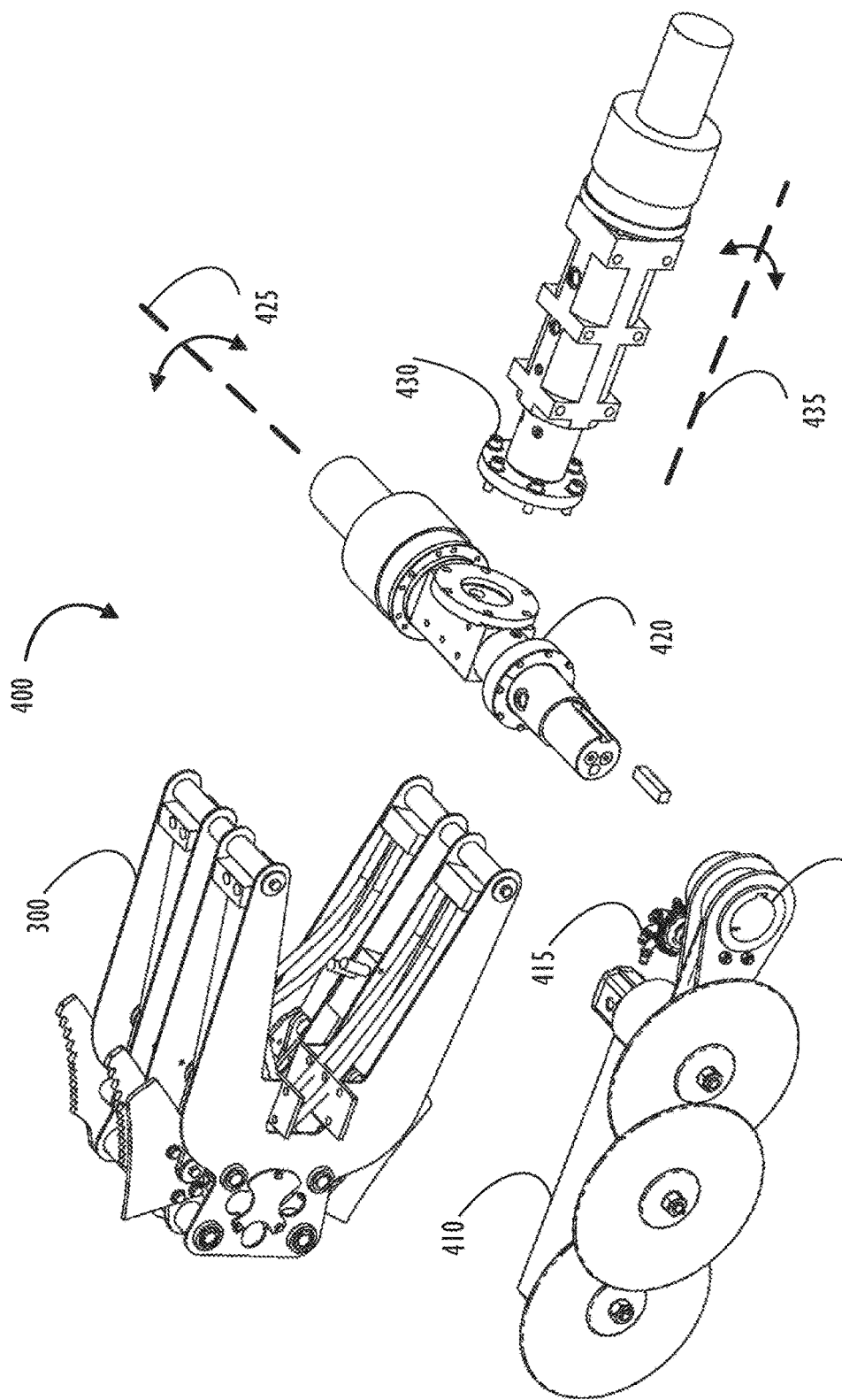
FIG. 4 illustrates an exploded view of a cutter head assembly, saw bar arm, and axial rotations connections according to one or more disclosed embodiments.

Referring now to FIG. 4 exploded view 400 illustrates cutter head assembly 300, saw bar arm 410, and other elements that are typically incorporated into certain embodiments of tree trimming apparatus 120. View 400 also shows two axis, represented by dashed lines 425 and 435, which are generally perpendicular to each other and indicate axial rotation capabilities of embodiments of tree trimming apparatus 120. In this example, saw bar arm 410 includes a three rotary blade assembly for cutting and axial connection 420 allows saw bar arm 410 to rotate around axis 425 in a complete circle. As will be understood, the plane of rotation of saw bar arm 410 will be generally parallel to the plane of the far end section of boom 310 (taking into account any angular change produced by actuator arm 510 described below with reference to FIG. 5). Also, axial connection 430 allows for circular rotation (around axis 435) of all components connected to the far side of connection 430. As shown, axis 435 is generally in line with the far end of the boom 130 (e.g., a boom axis), based on actuator arm 510 adjustment, and allows for a wrist-like rotation capability for portions of tree trimming apparatus 120 in certain embodiments. Each of axial rotator connection 420 and 430 also include a type of swivel assembly which provides independent fluid conductivity between a plurality of ports on either side of the swivel. In use axial rotators 420 and 430 allow an operator to rotate an entire attached assembly 360 degrees in either direction continuously relative to its corresponding rotational axis (e.g., 425 and 435). Also shown in view 400 is chemical spray manifold 415 located on saw bar arm 410. Chemical spray manifold 415 (more generically, sprayer) comprises one or more applicator heads that can be used to apply herbicide when saw bar arm 430 is in use. Another chemical spray head (not shown) could be positioned within cutter head assembly 300 to apply herbicide when limb shear blades 310 are in use. Note that limb clamps 320 are fully closed in the embodiments of FIGS. 3A-C. However, as shown in FIG. 4, they can also be fully opened as to be non-intrusive to the work area when not in use. Also note that saw bar arm 410 can remain in a fixed position, relative to cutter head assembly 300 and, while in this configuration, boom 130 can be moved to bring the cutter head assembly 300 into position to cut a target limb. As explained above, saw bar arm 410 can rotate 360 degrees around an axis 425 defined by saw bar arm attachment point 420. Saw bar arm 410 can also be rotated back and parallel to boom 130 when not in use (or removed completely) as to keep it from protruding and to increase precision for another tool such as limb shear 310.

Figure 5:
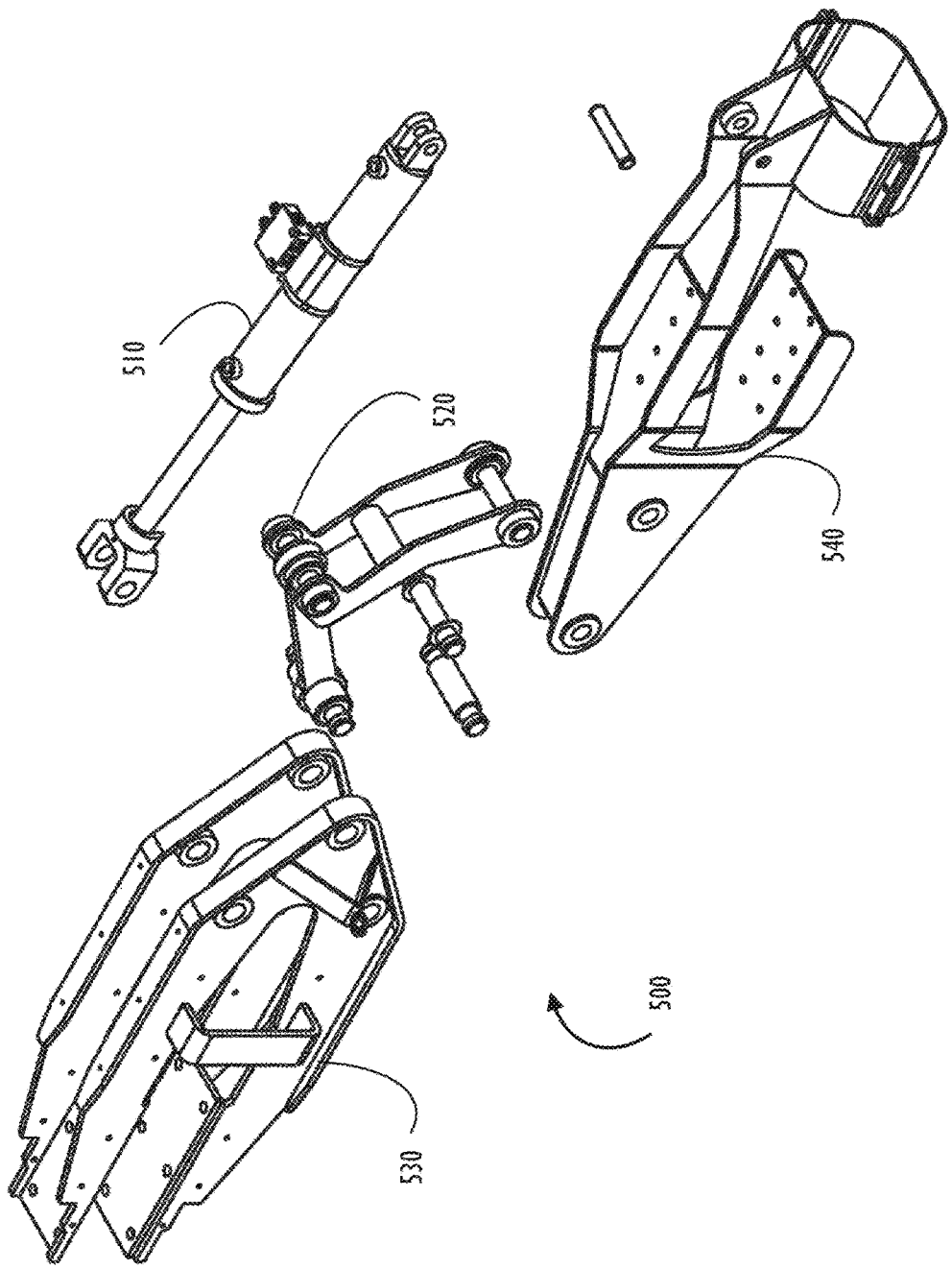
FIG. 5 illustrates an exploded view of a boom attachment mechanism, actuator arm and cutter head assembly mounting bracket according to one or more disclosed embodiments.

Referring now to FIG. 5, view 500 illustrates an exploded view of connectors to link components of tree trimming apparatus 120 to boom 130. In one embodiment, boom connector 540 connects to boom 130 using an attachment mechanism (e.g., bonding sleeve internal to boom to strengthen fiberglass structure) that slides over and bolts to a length at the end of the boom that may have increased structural strength. Different types of clamping/attachment mechanisms may be used for different types of booms. View 500 also shows actuator arm 510 and actuator pivot connection 520. Actuator arm 510 comprises a wand cylinder that actuates approximately 90 degrees in either direction. At the far end of actuator arm 510 cutter head assembly mounting bracket 530 is connected. Thus, cutter head assembly mounting bracket 530 is connected to the boom via pivot connection 520 and connected to actuator arm 510. The combination of the actuator arm 510 and pivot connection 520 allow an operator to orient the entire tree trimming apparatus 120 at a particular angle relative to the far end of the boom.

Figure 6:
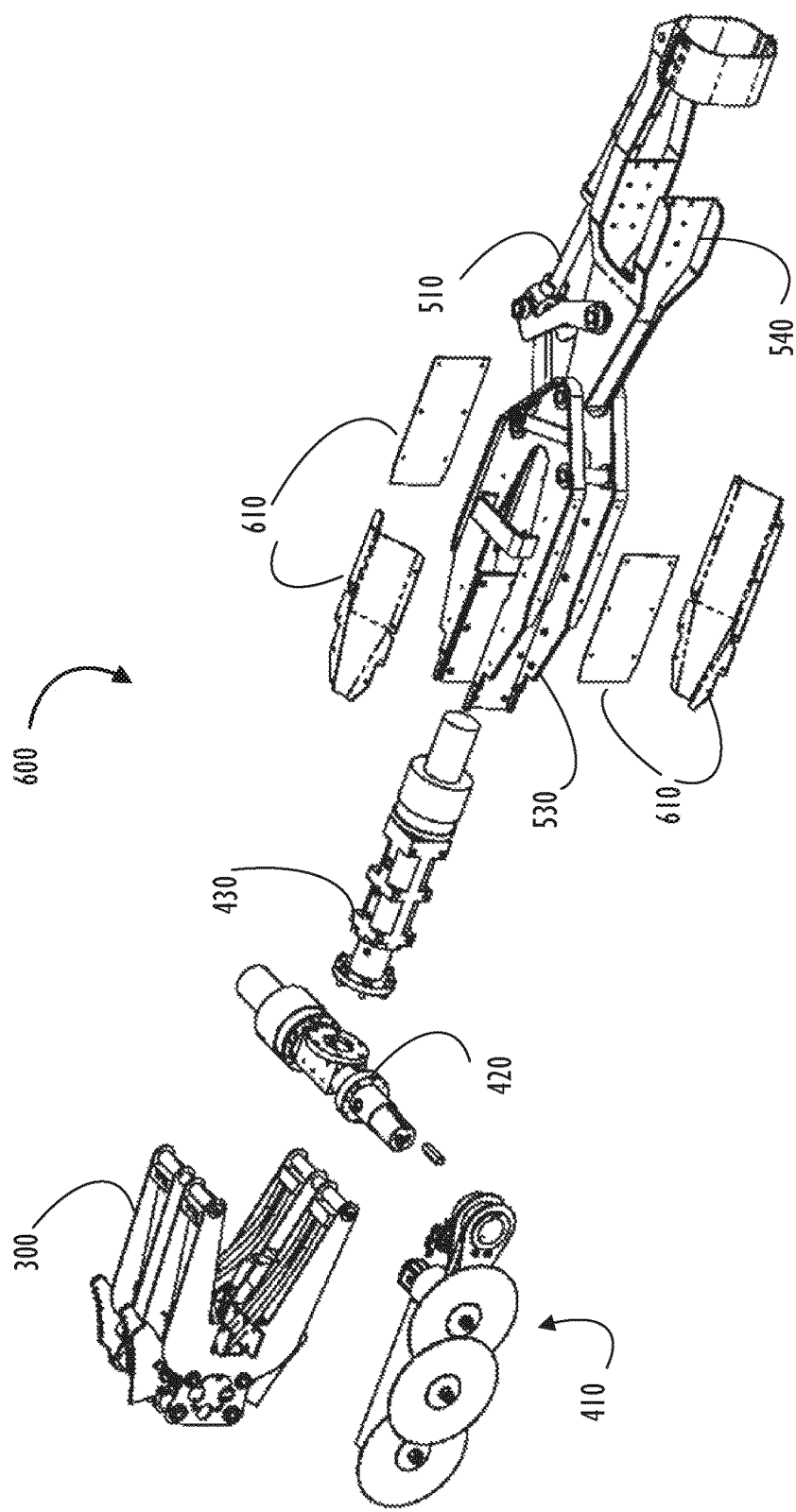
FIG. 6 illustrates an exploded view of elements from FIGS. 4 and 5.
Figure 7:
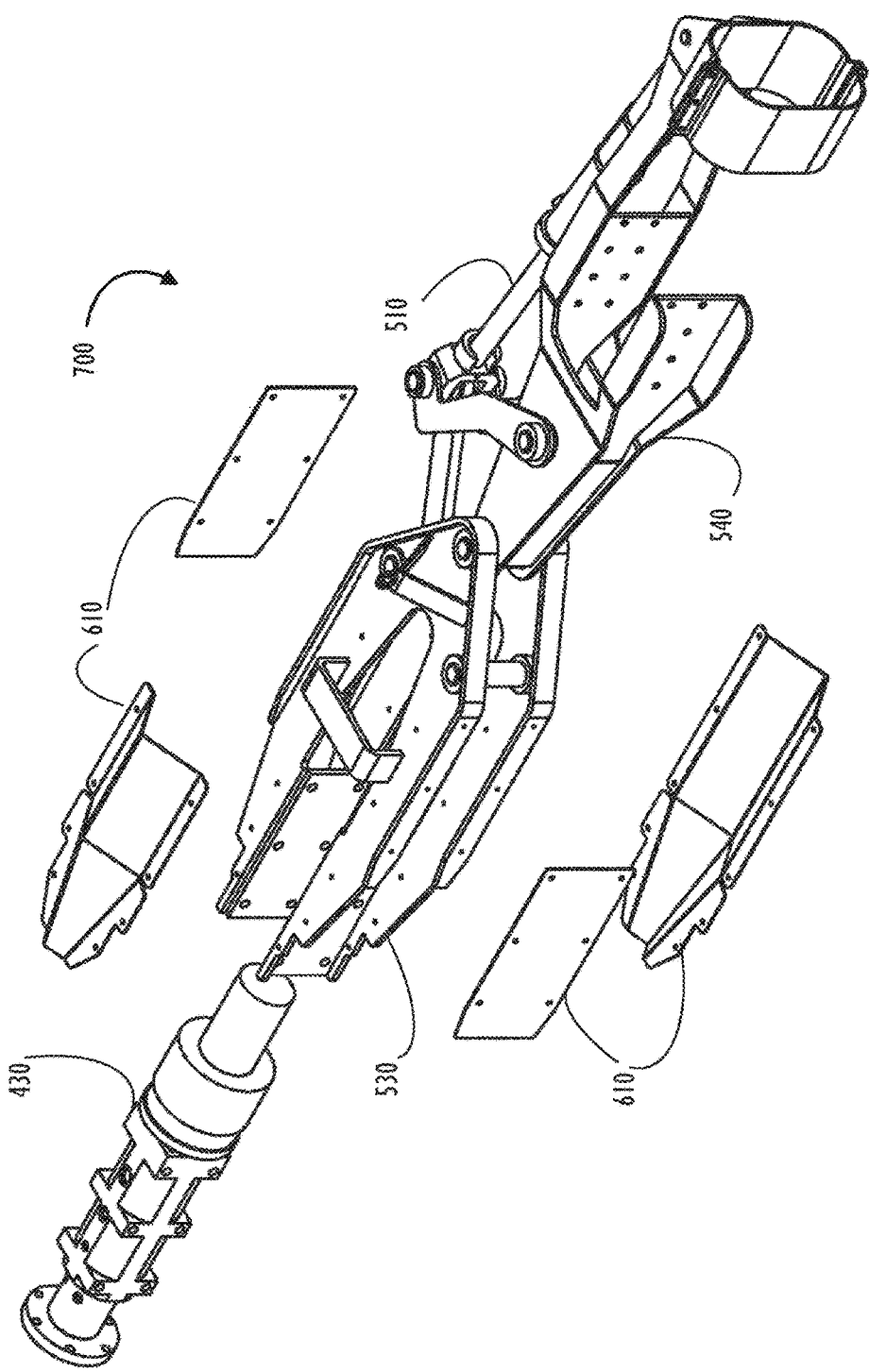
FIG. 7 illustrates another perspective view of boom attachment mechanism, cutter head assembly mounting bracket, axial rotator, and actuator arm (e.g., an actuator assembly).

Referring now to FIGS. 6-7, exploded views 600 and 700 illustrate relative orientation of boom connector 540 to cutter head assembly mounting bracket 530. Cover plates 610 are typically attached to cutter head assembly mounting bracket 530 for safety and to keep cut debris from interfering with axial rotator 430 and hydraulic hoses (such as 330). In this embodiment, axial rotator 430 connects partially inside cutter head assembly mounting bracket 530 and is connected to axial rotator 420 and in turn to saw bar arm 410 and cutter head assembly 300. FIG. 7 illustrates a different perspective view 700 that further illustrates how axial rotator 430 connects inside cutter head assembly mounting bracket 530 and is protected by optional cover plates 610. View 700 shows component parts that can be collectively referred to as an "actuator assembly."

Figure 8A:
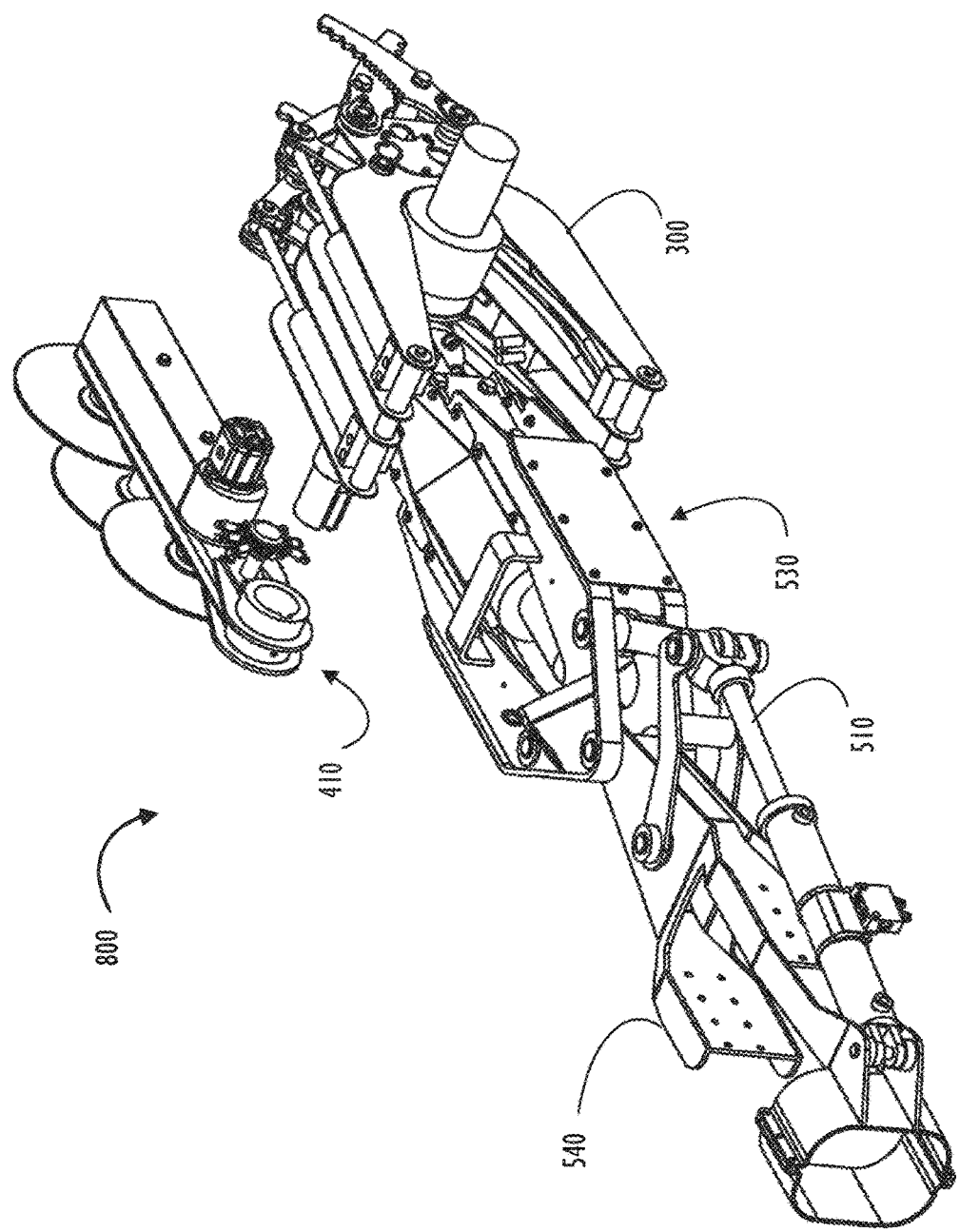

Referring now to FIGS. 8A-C, view 800 is shown from three different visual perspectives. Each of FIGS. 8A, 8B and 8C illustrate a substantially complete configuration of tree trimming apparatus 210 incorporating the elements from FIGS. 3-7.

Figure 9:
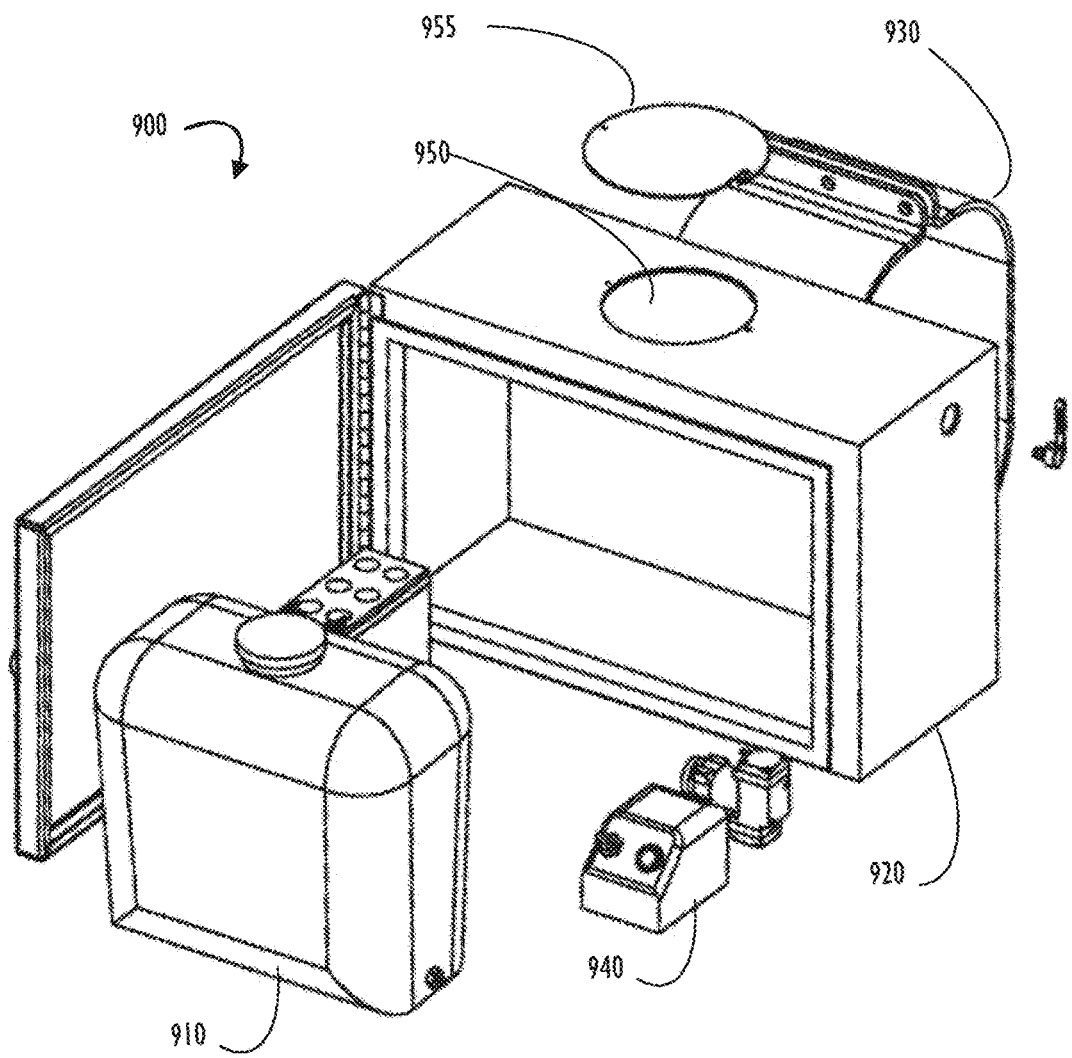
FIG. 9 illustrates a boom attachable tank and tank box according to one or more disclosed embodiments.

Referring now to FIG. 9, tank box assembly 900 comprises a tank 910, a tank box 920 and a boom attachment 930 for tank box 920. Remote receiver 940 can wirelessly receive signals to control output of tank 910. Tank box 920 further comprises access port 950 and access port cover 955 which allow for refilling or adjustment of tank 910 without requiring removal of tank from tank box 920. Wireless access control of tank 910 reduces or eliminates potential electrical conductivity issues associated with tank control operations.

Tank box 920 can be attached to the upper portion of insulated boom 130 with a bolted connection. The actual tank mounting connection may be an adjustable tank strap (e.g., 930), bolted foot mount or bolted side rails (where the tank has feet that slide into the rails and lock down allowing for easy removal). Tank box 920 can be attached underneath the boom or on the outer side of the boom opposite the cutter head and mounted through or alongside the axial rotation connection to the steel sleeve in the inner end of the boom. As shown, tank box 920 can have a fill access port 950 where an operator could fill tank 910 without removing it from the boom and can have a drain port off of the discharge side hose connection to the tank allowing for cleaning or evacuation of residual chemical. A shut off valve could be placed just past the drain port to keep fluid from running out through the head when cleaning.

Tank 910 could be driven by a small pump and remote control. Alternatively, Tank 910 could be pre-charged with nitrogen or air (bladder inside tank 910 or sealed plunger inside tank 910) or could be driven with a hydraulic cylinder. A high pressure discharge hose (e.g., 1110 from FIG. 11 described below) could be connected to tank 910 with a quick connect fitting. Tank 910 would typically be used for low volume chemical applications and be connected to a sprayer head to spray chemicals proximate to cutter head assembly 300. In other words, a sprayer head could be configured to spray on the foliage being cut, cutter head assembly 300, saw bar arm 410, limb shear 310, etc. Discharge hose 1110 can be connected to a portion of cutter head assembly 300 or pass through a port on the swivel connection included in one of the axial rotators. Also, tank 910 can be made of high strength fiberglass (similar to a water softener tank), steel with an internal liner to allow for chemical resistance, or high strength PVC. In general, any material that will effectively and legally accommodate the internal chemicals and discharge mechanism and not overly increase weight on boom 130 could be used. In summary, tank 910 also allows for automatic precision spraying of low volume chemicals without requiring close proximity to the operator.

Figure 10A:
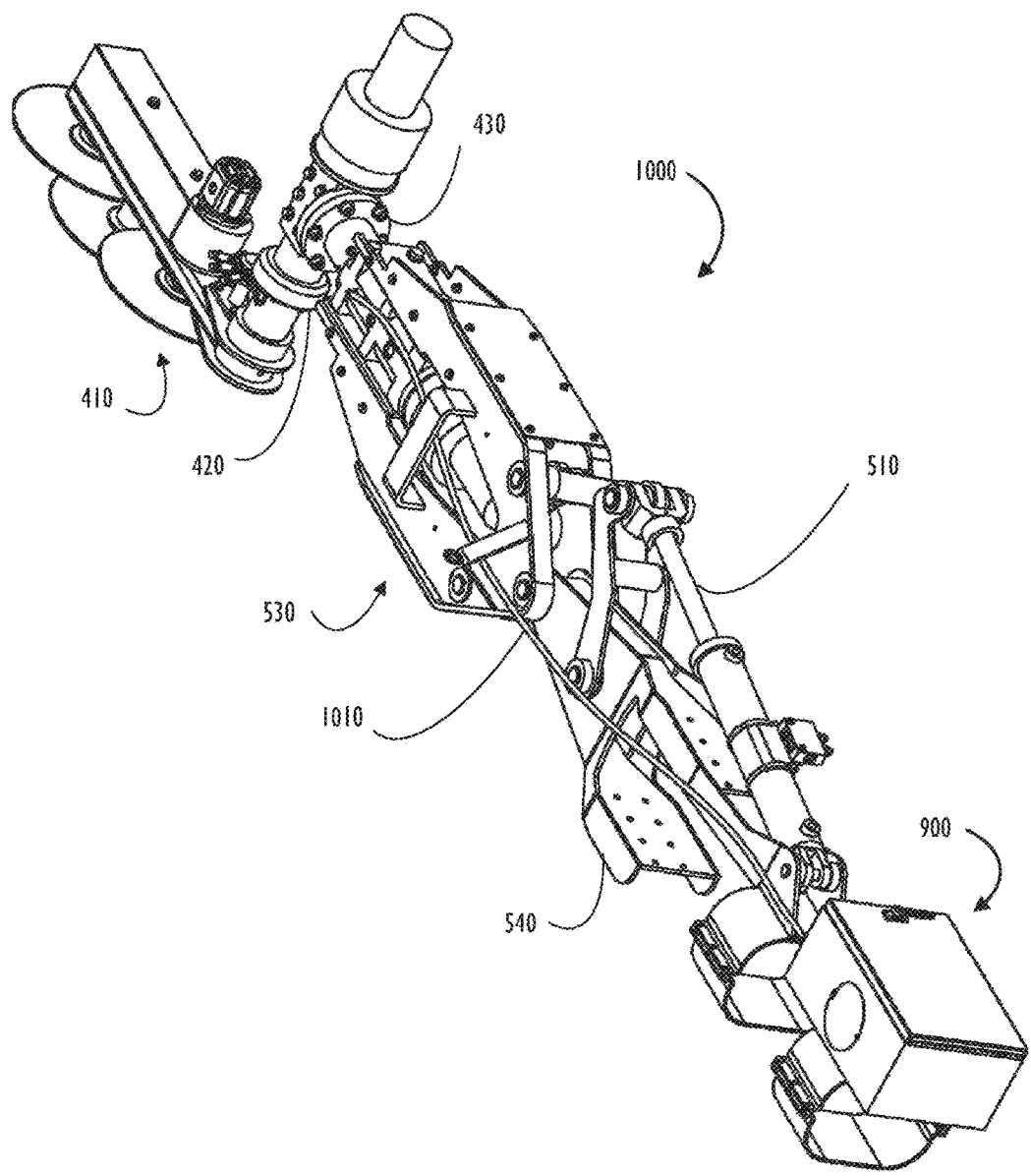
FIGS. 10A-B illustrate different perspective views of a substantially complete boom assembly (minus cutter head assembly) according to one or more disclosed embodiments.
Figure 10B:
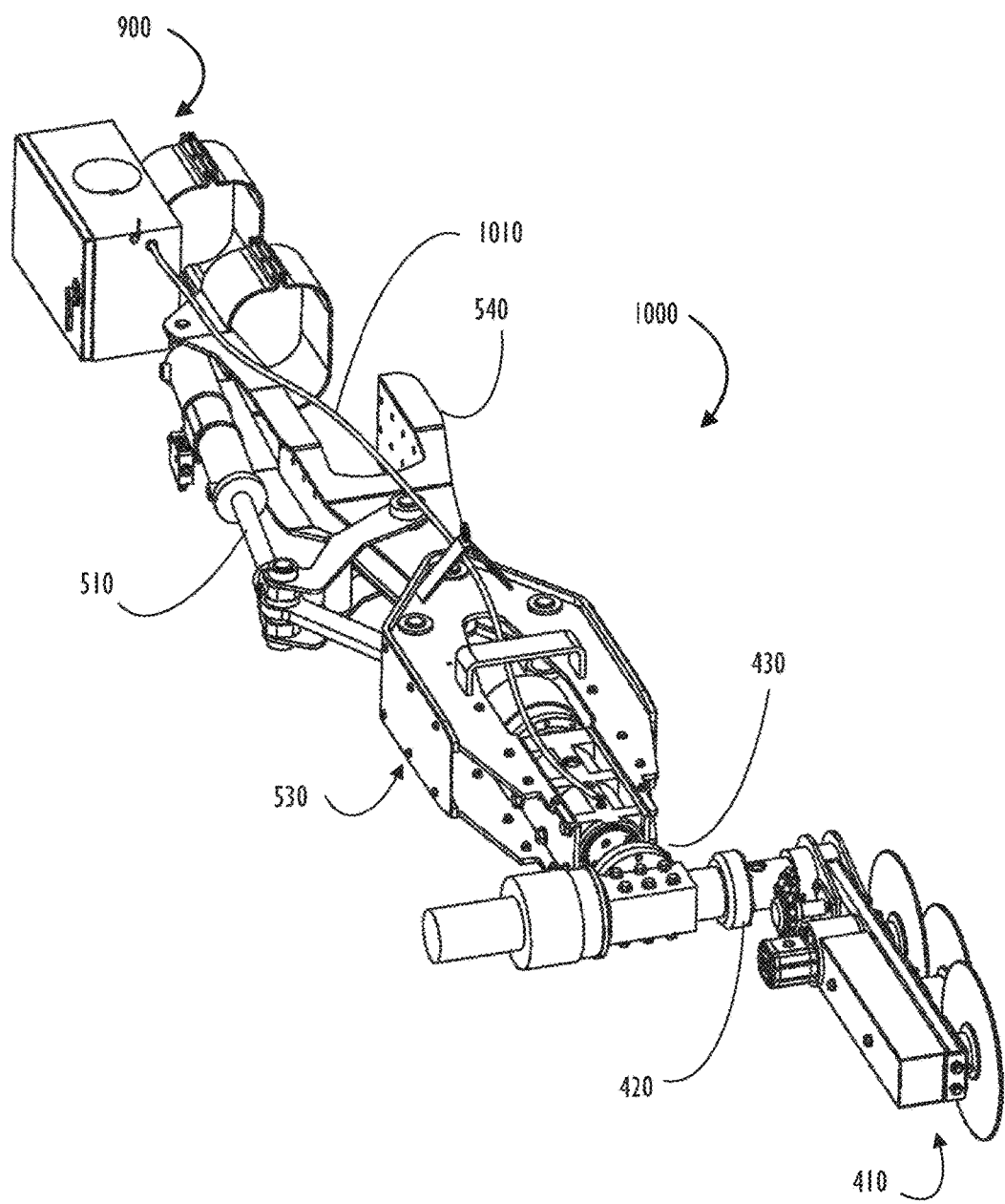

Referring now to FIG. 10A-B, two different perspective views 1000 illustrate tank box assembly 900 in conjunction with other elements of tree trimming apparatus 120 in one example embodiment. Supply hose 1010 connects through axial connector 430 via a ported swivel so as to not impede rotational capabilities of cutter head assembly 300.

Figure 11:
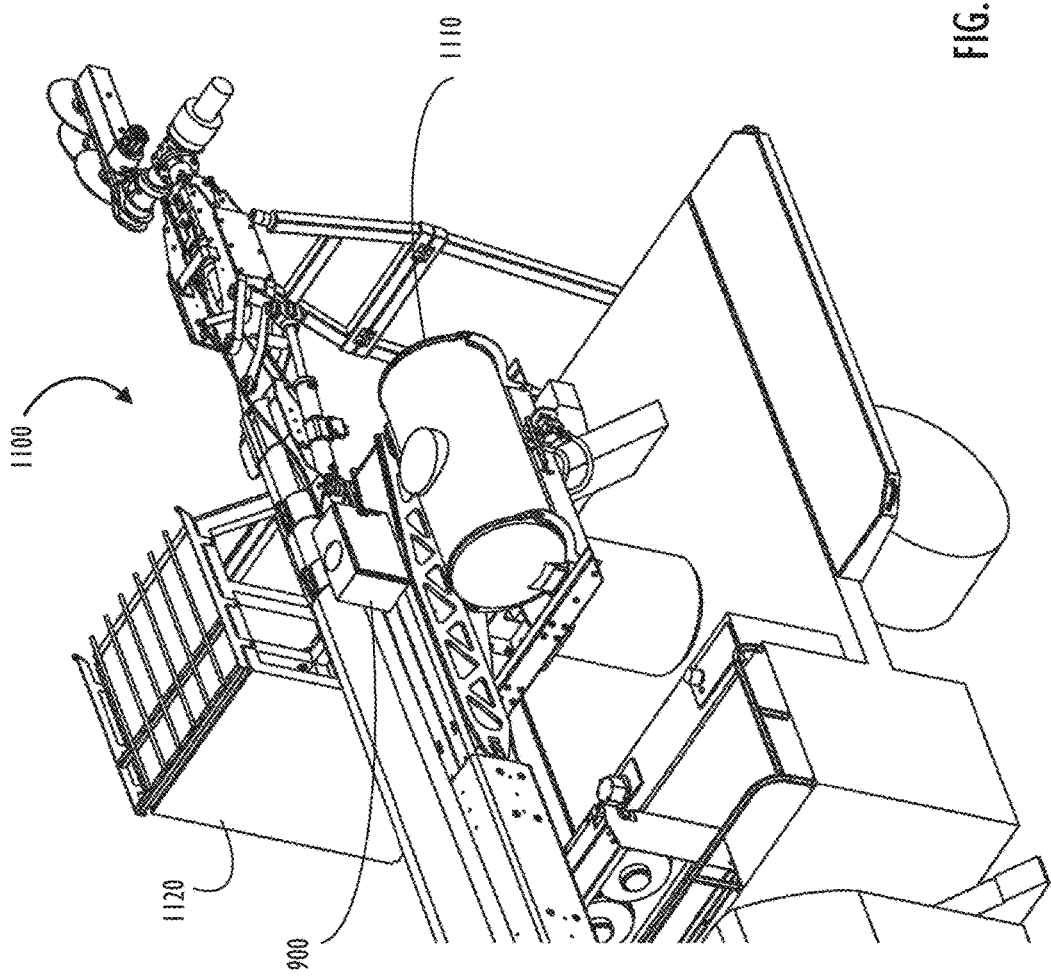
FIG. 11 illustrates the assembly of FIGS. 10A-B oriented on a transport vehicle.

Referring now to FIG. 11, a rear portion of a transport vehicle 1100 is shown. Another example of a protected operator cab 1120 is shown. Also, a high volume tank 1110 is shown. High volume tank 1110 can either be independent of tank 910 or used in conjunction with tank 910. However, when high volume tank 1110 and tank 910 are in fluid connection electrical insulation of boom 130 may be lost. Therefore, tanks 910 and 1110 may only be used in connection when taking this consideration into account. Obviously, tank 1110 could be used to periodically refill/clean tank 910 or contain liquids unrelated to tank 910.

Also, tanks 910 or 1110 could be used for automated cleaning of saw blades and other cutting apparatus prior to moving to a subsequent tree. For example, a chlorine based cleaning of cutting apparatus may be required to prevent spreading of diseases amongst trees (e.g., oak wilt disease). Additionally, other site specific requirements may exist and location of tank 910 allows for precision application of sprays or wound dressings. In particular, some materials to be applied are very viscous and it may be desirable to minimize length of supply hose 1110 because of difficulty in cleaning the supply hose itself.

Figure 12A:
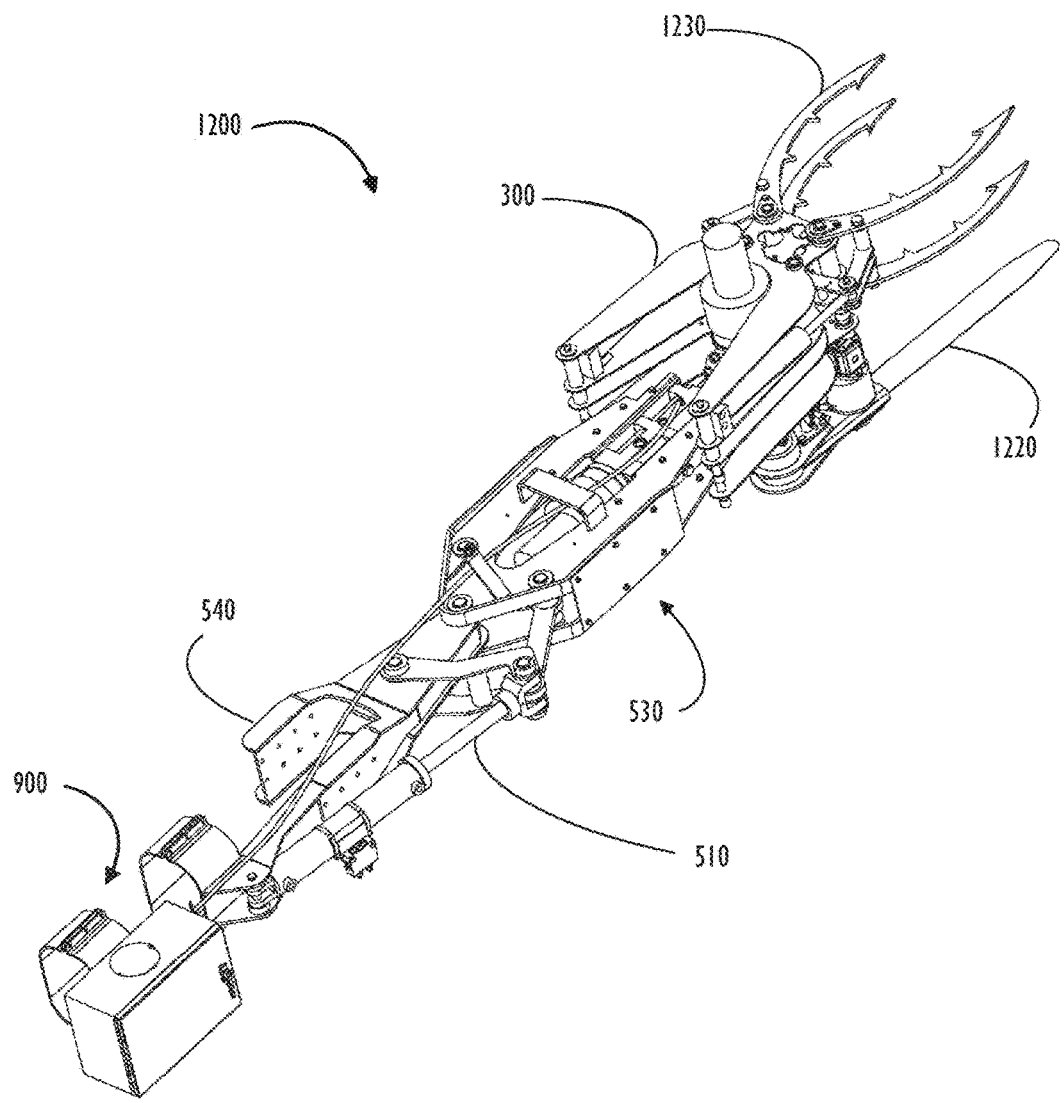
FIGS. 12A-C illustrate different perspective views of a boom assembly with a trunk clamp and chainsaw style saw bar arm according to one or more disclosed embodiments.
Figure 12B:
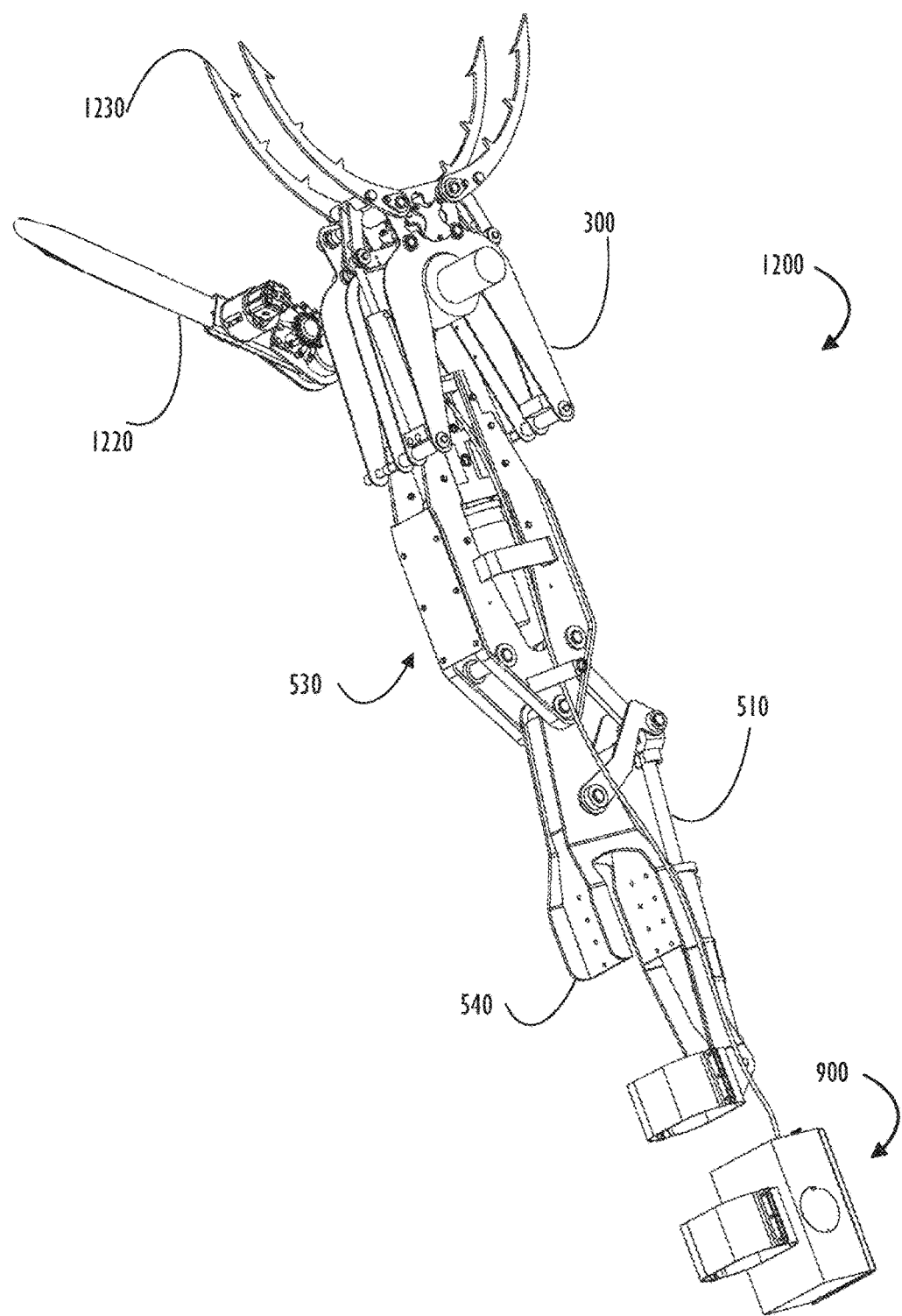
Figure 12C:
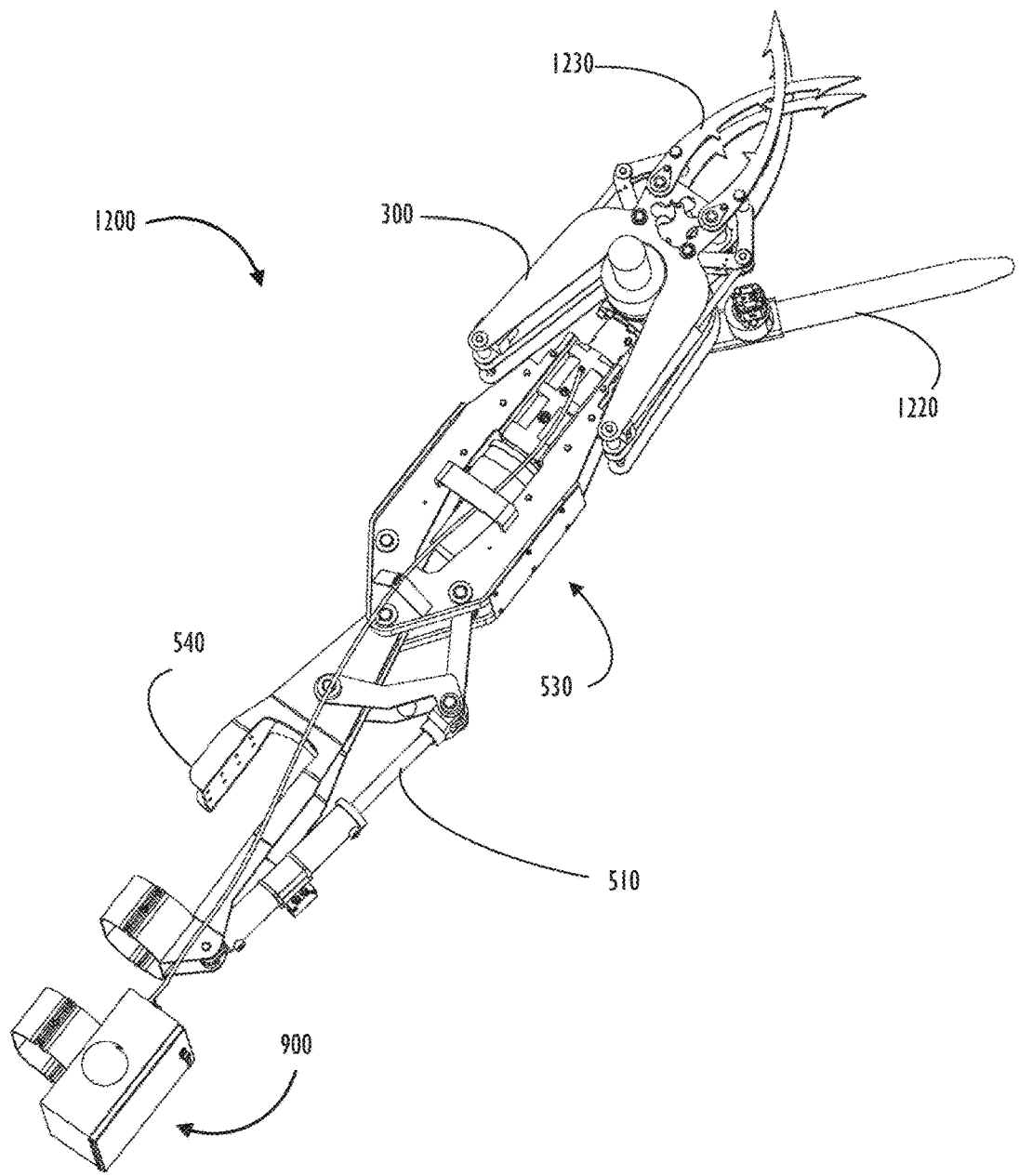

Referring now to FIGS. 12A-C, three different perspective views 1200 are shown to illustrate yet another embodiment of tree trimming apparatus 120. In this embodiment saw bar arm 410 has been replaced with a chainsaw style saw bar arm 1220. Also, trunk clamp 1230 has been introduced. Trunk clamp 1230 is generally larger and stronger than limb clamp 320. Using this embodiment an operator could grasp a portion of a tree trunk with trunk clamp 1230 and rotation saw bar arm 1220 under the clamped trunk portion to sever a section of trunk and safely lower the severed trunk portion to the ground. Thus, entire portions of a tree trunk could be removed from the top of the tree to the bottom of the tree. Note, the length and diameter of each trunk portion (based on the type of wood) could be varied to take into consideration weight capacity of boom 130. Also, in certain situations, vary large limbs could be removed utilizing trunk clamp 1230 and/or saw bar arm 1220. As is known to those of ordinary skill in the art, a chainsaw style blade could comprise an automatic tensioning capability (not shown) and may require a lubrication supply (not shown).

Figure 13:
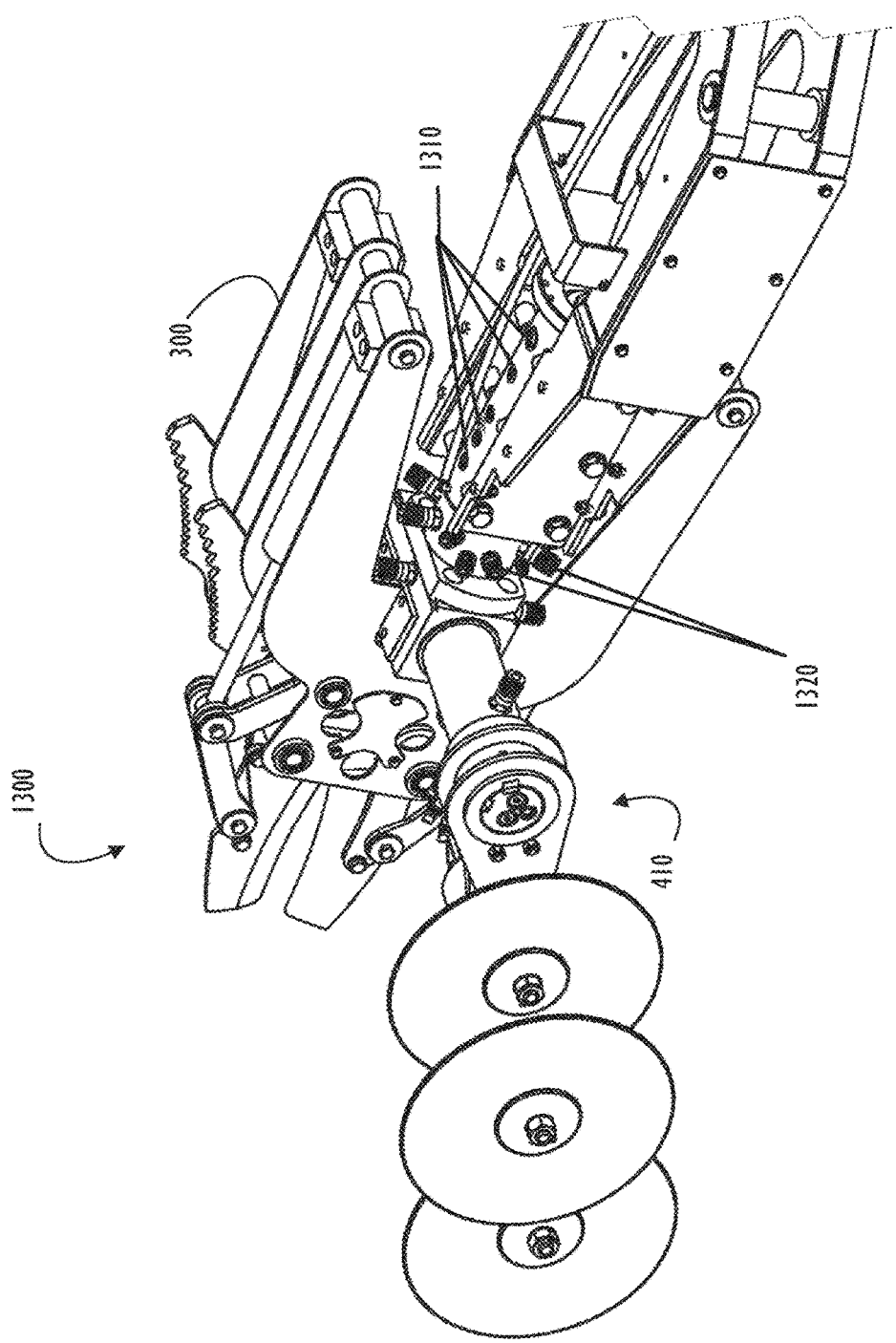
FIG. 13 illustrates hydraulic hose connections for quick connecting hydraulically powered accessories to a cutter head assembly.
Figure 14:
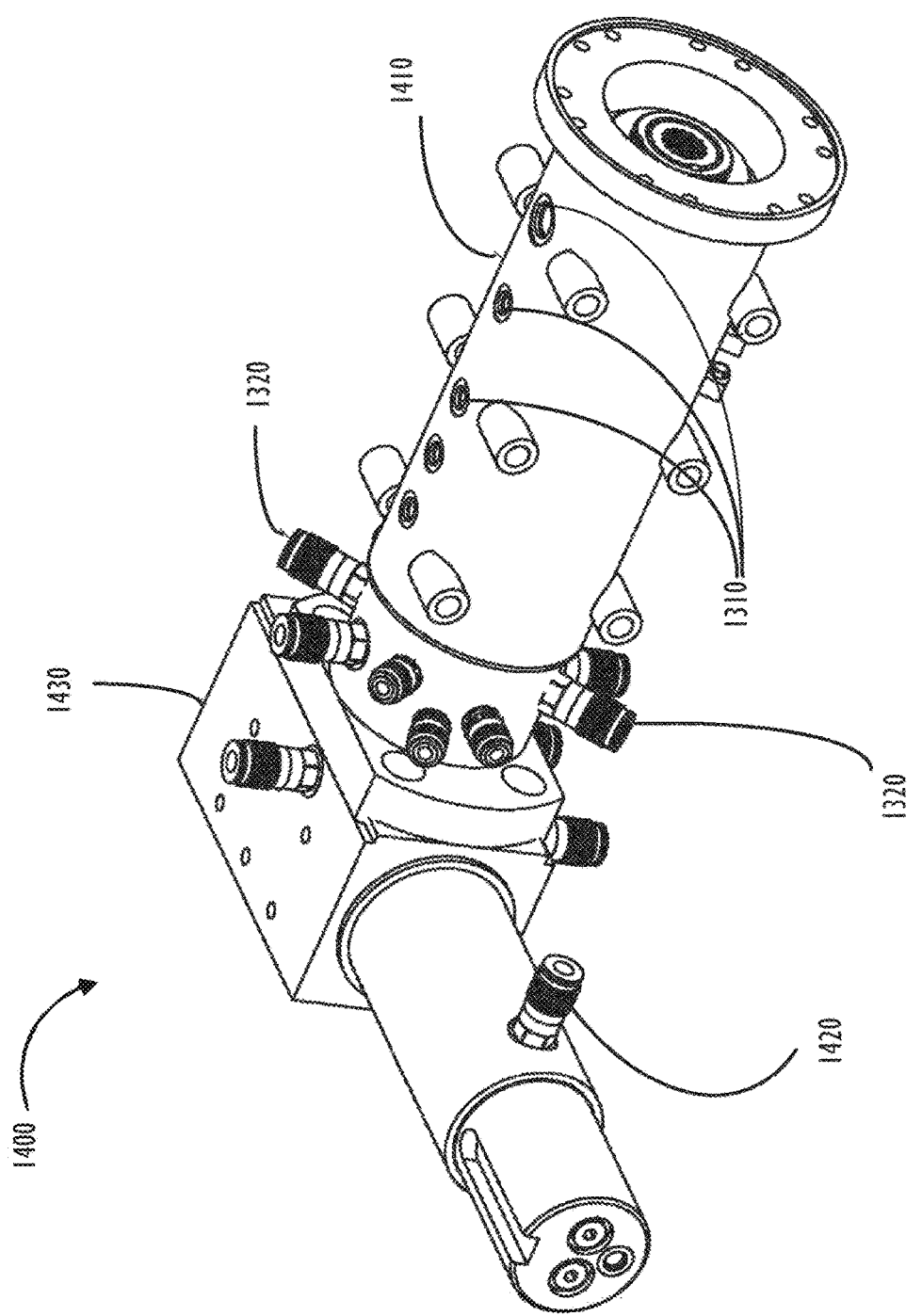
FIG. 14 illustrates a more detailed view of an axial swivel with hydraulic ports to supply hydraulic fluid conductivity through the swivel.

Referring now to FIGS. 13 and 14, quick connectors and fluid connections configured to provide pressure power through a ported axial swivel are shown. View 1300 of FIG. 13 shows hydraulic fluid input ports 1310 and corresponding quick connect ports 1320 leaving the other side of the axial swivel (ports 1310 and 1320 may be referred to as "swivel ports" to indicate they are ports on the axial swivel). Hydraulic hoses are not shown so that details of the swivel can be seen. As explained above, each accessory attached to cutter head assembly can be individually powered by one or more hydraulic or pneumatic channels through the axial swivel. Axial rotator 430 is an example of an axial swivel. View 1400 of FIG. 14 shows axial swivel outer casing 1410, a quick connect/disconnect male fitting 1420 and a saw bar swivel 1430. In one embodiment, the quick connect/disconnect fittings on the axial swivel will connect to the quick connect/disconnect fittings on the saw bar swivel 1430 and to the limb clamp 320 and limb shear 310 cylinders via hydraulic hoses with the male end of the quick connect/disconnect fitting. The use of quick connect/disconnect fittings such as 1320 allow for quick removal/installation of the shear 310 and clamp 320 accessories without hydraulic fluid loss. Quick connect/disconnect type couplings are sometimes referred to as "push to connect" couplings because a male and a female adapter are simply pushed together to lock into place. The resulting coupling creates a dependable fluid (or air i.e., pneumatic) connection by way of a sealable coupling, such as the described quick connect/disconnect fittings 1320. To remove (i.e., quick disconnect) an outer ring sleeve is typically pulled against a spring and the male/female adapters can then be separated. Further examples and details of quick couplings can be found in "QD Couplings" H, IH & P Series Snap-tite product information guide and "Instrumentation Quick Coupling Products" Catalog 4220/USA of April 2008, both submitted in an IDS at the time of filing, each of which is incorporated by reference in its entirety.

Additionally, as mentioned above, cutter head assembly 300 can be configured in the field with attachments as opposed to having a fixed factory configuration. A quick-connect type of connection that locks into place allows an operator to change the configuration of cutter head assembly 300 to be appropriate for a given situation. Several options for field configuration are available such as a disconnecting saw bar arm 410 at interface 440 or by disconnecting the head at the interface to axial rotator 430. Quick-connect type connections also allow for ease of replacement and maintenance of attached devices when they break and allow an operator to maintain spare parts at a work location without requiring a trip to a repair facility immediately.

In another example, the entire cutter head assembly 300 could be disconnected and replaced with other assemblies to alter capabilities of the specially designed boom 130. Recall that boom 130 has load bearing quick connect/disconnect multi-port swivels at each of axial connections 430 and 420. Load bearing multi-port swivels that allow axial rotation in several different planes and allow for independent fluid pass through are not utilized in prior art aerial tree trimming applications. Furthermore, because of the type of connections at the far end of the boom, a very flexible type of apparatus is conceived that could transform in the field from a tree trimming apparatus to a man bucket style boom with a winch for hoisting tools and other materials up to the man bucket. Additionally, a "hot stick" type apparatus could be attached to the far end of the boom and allow for ground based resetting of blown breakers at the direction of a utility company (e.g., when a tree trimming company is contracted by an electrical utility company after a storm).

Referring back to the embodiment of FIG. 4, when cutting limbs of a smaller size, it may not be necessary to use any sawing mechanism on the cutter head assembly 300, and instead cutting can be accomplished by the limb shear 310. For example, an operator could manipulate boom 130 and use axial rotation of axial rotators 420 and 430 along with actuator arm 510 to align limb shear 310 with a target limb. The operator could then use the proportional pressure and variably serrated clamps 320 to grab and hold a portion of the target limb that is to be cut from the tree. The shears could then be activated to cut the target limb and the cut end would remain in the clamps 320 to be lowered to the ground. Any cut limbs could be rotated to fall more easily through the underlying foliage or power lines as discussed earlier. Also, limb shear 310 and the enhanced axial rotation capabilities described allow an operator using the disclosed apparatus to make an "arbor cut" which was difficult or impossible with prior art mechanical solutions. As used herein, an "arbor cut" refers to various well recognized tree trimming or pruning techniques as published by the International Society of Arborists (ISA) and are generally performed manually. For example, when cutting a limb it can be done at an angle relative to the limb itself rather than making a straight perpendicular cut. Different types of angle cuts could be important because of potential tree care and future growth concerns.

Referring again to FIG. 1, in operation disclosed embodiments could be controlled either from a protected operator cab 150 (or 250 or 1120) on a transport vehicle (e.g., truck 100 or vehicle 200) or by a remote control pack 161. A remote control pack 161 could be a "belly pack" and emulate the control capabilities available from within the standard operator cab (e.g., operator cab 150). One benefit of a remote control belly pack 161 is that it allows the operator 160 to be a safe distance from truck 100 when truck 100 is in operation. For example, in a particularly hazardous cutting situation (e.g., electrical/chemical concern) or when falling debris might be an issue. Alternatively, when, as described above, a man bucket and winch has been attached to boom 130 the belly pack 161 could be plugged into a docking port inside the bucket to allow an operator 160 to control boom 130 and actuator arm 510 movement from inside the bucket. When a belly pack 161 is inserted into a docking port certain safety measures could be implemented to disable or control axial rotation of the bucket (so as to not dump contents of the bucket including the operator 160).

In the foregoing description, for purposes of explanation, numerous specific details were set forth in order to provide a thorough understanding of the inventive concept. As part of this description, some structures and devices may be shown in block diagram form in order to avoid obscuring the invention. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiment is included in at least one embodiment of the invention, and multiple references to "one embodiment" or "an embodiment" should not be understood as necessarily all referring to the same embodiment.

It will be appreciated that in the development of any actual implementation (as in any development project), numerous decisions must be made to achieve the designers' specific goals (e.g., compliance with system- and business-related constraints), and that these goals will vary from one implementation to another. It will also be appreciated that such development efforts might be complex and time-consuming, but would nevertheless be a routine undertaking for those of ordinary skill in any field requiring design and implementation of boom mounted cutting apparatus having the benefit of this disclosure.

Various changes in the details of the illustrated operational methods and mechanical apparatuses are possible without departing from the scope of the following claims. For instance, illustrative embodiments of a cutter head and boom actuator attachment assembly configuration (e.g., FIGS. 2-4) may be configured differently based on different cutting requirements and operating conditions. Alternatively, some embodiments may combine the configurations of multiple assemblies described herein as being separate options. Similarly, one or more of the described options may be omitted, depending upon the specific operational environment the device is being used in.

What is claimed is:
1. A tree trimming apparatus comprising:
   a transport vehicle;

an aerial boom comprising one or more portions, having a boom axis, and attached at a proximate end of the aerial boom to the transport vehicle;

a cutter head assembly comprising a plurality of accessory ports, the plurality of accessory ports each associated with one or more couplings;

an actuator assembly connecting the cutter head assembly to a distal end of a most distal portion of the aerial boom, the actuator assembly comprising an axial rotator for turning the cutter head assembly in a plane perpendicular to the boom axis, the axial rotator comprising a rotating swivel, the rotating swivel further comprising a plurality of swivel ports, one or more of the plurality of swivel ports providing hydraulic or pneumatic power to at least one tree maintenance accessory attached via the one or more couplings, the actuator assembly further comprising a pivot connection and an actuator arm, the actuator arm configured to pivot the cutter head assembly relative to the most distal portion of the aerial boom; and one or more powered tree maintenance accessories connected to the cutter head assembly and to the couplings, wherein the one or more powered tree maintenance accessories are controlled by pressure provided via the couplings, and wherein the one or more powered tree maintenance accessories are separately attachable and detachable from the cutter head assembly.

2. The tree trimming apparatus of claim 1, wherein there are at least two powered tree maintenance accessories, the at least two powered tree maintenance accessories comprising a limb clamp and a limb shear.

3. The tree trimming apparatus of claim 1, wherein the actuator assembly further comprises a second rotator configured to rotate the at least one tree maintenance accessory in a plane parallel to the boom axis as adjusted by the actuator arm.

4. The tree trimming apparatus of claim 1, wherein the one or more powered tree maintenance accessories are either all hydraulic or all pneumatic.

5. The tree trimming apparatus of claim 1, wherein the one or more powered tree maintenance accessories comprise a hedge trimmer, the hedge trimmer comprising a plurality of individual tooth shears.

6. The tree trimming apparatus of claim 1, wherein the one or more powered tree maintenance accessories attached to the cutter head assembly are individually powered by one or more hydraulic channels through the axial swivel.

7. A method of operating a tree trimming apparatus, the method comprising:

identifying at least a portion of one or more trees to be cut;

positioning a transport vehicle proximate to the one or more trees, the transport vehicle comprising:

an aerial boom having one or more portions, the aerial boom having a boom axis and attached at a proximate end of the aerial boom to the transport vehicle;

a cutter head assembly comprising a plurality of accessory ports, the plurality of accessory ports each associated with one or more couplings;

an actuator assembly connecting the cutter head assembly to a distal end of a most distal portion of the aerial boom, the actuator assembly comprising an axial rotator for turning the cutter head assembly in a plane perpendicular to the boom axis, the axial rotator comprising a rotating swivel, the rotating swivel further comprising a plurality of swivel ports, one or more of the plurality of swivel ports providing hydraulic or pneumatic power to at least one tree maintenance accessory attached via the one or more couplings, the actuator assembly further comprising a pivot connection and an actuator arm, the actuator arm configured to pivot the cutter head assembly relative to the most distal portion of the aerial boom; and one or more powered tree maintenance accessories connected to the cutter head assembly and to the couplings, wherein the one or more powered tree maintenance accessories are controlled by pressure provided via the couplings, and wherein the one or more powered tree maintenance accessories are separately attachable and detachable from the cutter head assembly;

configuring the cutter head assembly with the one or more powered tree maintenance accessories based on the identification of the at least a portion; and cutting a first of the one or more trees utilizing the configured cutter head assembly.

8. The method of operating a tree trimming apparatus of claim 7, wherein there are at least two powered tree maintenance accessories, the at least two powered tree maintenance accessories comprising a limb clamp and a limb shear.

9. The method of operating a tree trimming apparatus of claim 7, wherein the actuator assembly further comprises a second rotator configured to rotate the at least one tree maintenance accessory in a plane parallel to the boom axis as adjusted by the actuator arm.

10. The method of operating a tree trimming apparatus of claim 7, wherein the one or more powered tree maintenance accessories are either all hydraulic or all pneumatic.

11. The method of operating a tree trimming apparatus of claim 7, wherein the one or more powered tree maintenance accessories comprise a hedge trimmer, the hedge trimmer comprising a plurality of individual tooth shears.

12. The method of operating a tree trimming apparatus of claim 7, wherein the one or more powered tree maintenance accessories attached to the cutter head assembly are individually powered by one or more hydraulic channels through the axial swivel.

13. The method of operating a tree trimming apparatus of claim 7, wherein there are at least two powered tree maintenance accessories, the at least two powered tree maintenance accessories comprising a limb clamp and a saw bar.

14. The method of operating a tree trimming apparatus of claim 7, wherein there are at least two powered tree maintenance accessories, the at least two powered tree maintenance accessories comprising a truck clamp and a chain saw.

15. The tree trimming apparatus of claim 1, wherein there are at least two powered tree maintenance accessories, the at least two powered tree maintenance accessories comprising a limb clamp and a saw bar.

16. The tree trimming apparatus of claim 1, wherein there are at least two powered tree maintenance accessories, the at least two powered tree maintenance accessories comprising a trunk clamp and a chain saw.

17. The tree trimming apparatus of claim 1, wherein the cutter head assembly is attachable and detachable from the actuator assembly.

18. The method of operating a tree trimming apparatus of claim 7, wherein the cutter head assembly is attachable and detachable from the actuator assembly.

* * * * *